United States Patent
An

(10) Patent No.: US 9,995,942 B2
(45) Date of Patent: Jun. 12, 2018

(54) AUTOSTEREOSCOPIC 3D DISPLAY DEVICE

(71) Applicant: LG Display Co., Ltd., Seoul (KR)

(72) Inventor: ChungHwan An, Seoul (KR)

(73) Assignee: LG Display Co., Ltd., Seoul (KR)

( * ) Notice: Subject to any disclaimer, the term of this patent is extended or adjusted under 35 U.S.C. 154(b) by 299 days.

(21) Appl. No.: 14/849,087

(22) Filed: Sep. 9, 2015

(65) Prior Publication Data
US 2016/0077349 A1 Mar. 17, 2016

(30) Foreign Application Priority Data

Sep. 11, 2014 (KR) .................. 10-2014-0120366

(51) Int. Cl.
| G02B 27/22 | (2018.01) |
| H04N 13/00 | (2018.01) |
| H04N 13/04 | (2006.01) |

(52) U.S. Cl.
CPC ..... *G02B 27/2214* (2013.01); *H04N 13/0404* (2013.01); *H04N 13/0409* (2013.01); *H04N 13/0415* (2013.01); *H04N 13/0445* (2013.01); *H04N 13/0447* (2013.01); *H04N 13/0497* (2013.01); *H04N 2213/001* (2013.01)

(58) Field of Classification Search
None
See application file for complete search history.

(56) References Cited

U.S. PATENT DOCUMENTS

| 5,991,073 | A | * | 11/1999 | Woodgate | ............ | G02B 27/225 |
| | | | | | | 348/E13.004 |
| 2003/0016444 | A1 | | 1/2003 | Brown et al. | | |
| 2015/0015681 | A1 | * | 1/2015 | Kim | ................... | G02B 27/2214 |
| | | | | | | 348/51 |

FOREIGN PATENT DOCUMENTS

| CN | 103916655 A | 7/2014 |
| EP | 2753086 A2 | 7/2014 |
| EP | 2811746 A1 | 12/2014 |
| WO | WO 2013/115444 A1 | 8/2013 |

OTHER PUBLICATIONS

Chinese Office Action, Chinese Application No. 201510578985.0, dated Feb. 8, 2017, 17 pages (with concise explanation of relevance).
European Extended Search Report, European Application No. 15184824.9, dated Feb. 15, 2016, 8 pages.

* cited by examiner

*Primary Examiner* — Edemio Navas, Jr.
(74) *Attorney, Agent, or Firm* — Fenwick & West LLP

(57) ABSTRACT

An autostereoscopic 3D display device according to embodiments of the present disclosure may be configured to set the width of a viewing diamond to a/n times (where a and n are natural numbers satisfying the condition: a<n) of the interocular distance while at the same time overlapping the viewing diamonds with each other. Furthermore, the same or similar input data between adjoining views may be newly mapped through a view data rendering process.
Accordingly, it may be possible to provide an effect of removing or minimizing 3D crosstalk, luminance difference, and image flipping in stereoscopic images, thereby enhancing the perceived depth of stereoscopic images.

20 Claims, 34 Drawing Sheets

| | INPUT IMAGE | | CONVERTED IMAGE |
|---|---|---|---|
| 1st VIEW | 1 | ⇒ | 1 |
| 2nd VIEW | 2 | ⇒ | 1 |
| 3rd VIEW | 3 | ⇒ | 2 |
| 4th VIEW | 4 | ⇒ | 2 |
| 5th VIEW | 5 | ⇒ | 3 |
| 6th VIEW | 6 | ⇒ | 3 |
| 7th VIEW | 7 | ⇒ | 4 |
| 8th VIEW | 8 | ⇒ | 4 |
| 9st VIEW | 9 | ⇒ | 5 |
| 10nd VIEW | 10 | ⇒ | 5 |
| 11th VIEW | 11 | ⇒ | 6 |
| 12th VIEW | 12 | ⇒ | 6 |
| 13th VIEW | 13 | ⇒ | 7 |
| 14th VIEW | 14 | ⇒ | 7 |
| 15th VIEW | 15 | ⇒ | 8 |
| 16th VIEW | 16 | ⇒ | 8 |

|  | INPUT IMAGE |  | CONVERTED IMAGE |
|---|---|---|---|
| 1st VIEW | 1 | ⇨ | 1 |
| 2nd VIEW | 2 | ⇨ | 1 |
| 3rd VIEW | 3 | ⇨ | 1 |
| 4th VIEW | 4 | ⇨ | 1 |
| 5th VIEW | 5 | ⇨ | 2 |
| 6th VIEW | 6 | ⇨ | 2 |
| 7th VIEW | 7 | ⇨ | 2 |
| 8th VIEW | 8 | ⇨ | 2 |
| 9st VIEW | 9 | ⇨ | 3 |
| 10nd VIEW | 10 | ⇨ | 3 |
| 11th VIEW | 11 | ⇨ | 3 |
| 12th VIEW | 12 | ⇨ | 3 |
| 13th VIEW | 13 | ⇨ | 4 |
| 14th VIEW | 14 | ⇨ | 4 |
| 15th VIEW | 15 | ⇨ | 4 |
| 16th VIEW | 16 | ⇨ | 4 |

| | INPUT IMAGE | | CONVERTED IMAGE |
|---|---|---|---|
| 1st VIEW | 1 | ⇒ | 1 |
| 2nd VIEW | 2 | ⇒ | 1 |
| 3rd VIEW | 3 | ⇒ | 1 |
| 4th VIEW | 4 | ⇒ | 1.5 |
| 5th VIEW | 5 | ⇒ | 2 |
| 6th VIEW | 6 | ⇒ | 2 |
| 7th VIEW | 7 | ⇒ | 2 |
| 8th VIEW | 8 | ⇒ | 2.5 |
| 9st VIEW | 9 | ⇒ | 3 |
| 10nd VIEW | 10 | ⇒ | 3 |
| 11th VIEW | 11 | ⇒ | 3 |
| 12th VIEW | 12 | ⇒ | 3.5 |
| 13th VIEW | 13 | ⇒ | 4 |
| 14th VIEW | 14 | ⇒ | 4 |
| 15th VIEW | 15 | ⇒ | 4 |
| 16th VIEW | 16 | ⇒ | 4 |

| R | G | B | R | G | B | R | G | B | R | G | B | R | G | B | R | G | B |
|---|---|---|---|---|---|---|---|---|---|---|---|---|---|---|---|---|---|
| 1 | 1 | 2 | 3 | 3 | 3 | 1 | 1 | 2 | 2 | 3 | 3 | 1 | 1 | 2 | 2 | 3 | 3 |
| 3 | 1 | 1 | 2 | 2 | 3 | 3 | 1 | 1 | 2 | 2 | 3 | 3 | 1 | 1 | 2 | 2 | 3 |
| 3 | 1 | 1 | 2 | 2 | 3 | 3 | 1 | 1 | 2 | 2 | 3 | 3 | 1 | 1 | 2 | 2 | 3 |
| 3 | 1 | 1 | 2 | 2 | 3 | 3 | 1 | 1 | 2 | 2 | 3 | 3 | 1 | 1 | 2 | 2 | 3 |
| 3 | 3 | 1 | 1 | 2 | 2 | 3 | 3 | 1 | 1 | 2 | 2 | 3 | 3 | 1 | 1 | 2 | 2 |

FIG. 29

|  | INPUT IMAGE | | CONVERTED IMAGE |
|---|---|---|---|
| 1st VIEW | 1 | ⇒ | 1 |
| 2nd VIEW | 2 | ⇒ | 1 |
| 3rd VIEW | 3 | ⇒ | 1 |
| 4th VIEW | 4 | ⇒ | 1 |
| 5th VIEW | 5 | ⇒ | 1 |
| 6th VIEW | 6 | ⇒ | 1 |
| 7th VIEW | 7 | ⇒ | 2 |
| 8th VIEW | 8 | ⇒ | 2 |
| 9st VIEW | 9 | ⇒ | 2 |
| 10nd VIEW | 10 | ⇒ | 2 |
| 11th VIEW | 11 | ⇒ | 2 |
| 12th VIEW | 12 | ⇒ | 2 |
| 13th VIEW | 13 | ⇒ | 3 |
| 14th VIEW | 14 | ⇒ | 3 |
| 15th VIEW | 15 | ⇒ | 3 |
| 16th VIEW | 16 | ⇒ | 3 |
| 17th VIEW | 17 | ⇒ | 3 |
| 18th VIEW | 18 | ⇒ | 3 |

FIG. 30

| R | G | B | R | G | B | R | G | B | R | G | B | R | G | B | R | G | B |
|---|---|---|---|---|---|---|---|---|---|---|---|---|---|---|---|---|---|
| 1 | 1 | 2 | 3 | 3 | 3 | 1 | 1 | 2 | 2 | 3 | 3 | 1 | 1 | 2 | 2 | 3 | 3 |
| 3 | 1 | 1.5 | 2 | 2.5 | 3 | 3 | 1 | 1.5 | 2 | 2.5 | 3 | 3 | 1 | 1.5 | 2 | 2.5 | 3 |
| 3 | 1 | 1.5 | 2 | 2.5 | 3 | 3 | 1 | 1.5 | 2 | 2.5 | 3 | 3 | 1 | 1.5 | 2 | 2.5 | 3 |
| 3 | 1 | 1 | 2 | 2 | 3 | 3 | 1 | 1 | 2 | 2 | 3 | 3 | 1 | 1 | 2 | 2 | 3 |
| 2.5 | 3 | 1 | 1.5 | 2 | 2.5 | 3 | 3 | 1 | 1.5 | 2 | 2.5 | 3 | 3 | 1 | 1.5 | 2 | 2.5 |

FIG. 31

| | INPUT IMAGE | | CONVERTED IMAGE |
|---|---|---|---|
| 1st VIEW | 1 | ⇒ | 1 |
| 2nd VIEW | 2 | ⇒ | 1 |
| 3rd VIEW | 3 | ⇒ | 1 |
| 4th VIEW | 4 | ⇒ | 1 |
| 5th VIEW | 5 | ⇒ | 1.5 |
| 6th VIEW | 6 | ⇒ | 1.5 |
| 7th VIEW | 7 | ⇒ | 2 |
| 8th VIEW | 8 | ⇒ | 2 |
| 9st VIEW | 9 | ⇒ | 2 |
| 10nd VIEW | 10 | ⇒ | 2 |
| 11th VIEW | 11 | ⇒ | 2.5 |
| 12th VIEW | 12 | ⇒ | 2.5 |
| 13th VIEW | 13 | ⇒ | 3 |
| 14th VIEW | 14 | ⇒ | 3 |
| 15th VIEW | 15 | ⇒ | 3 |
| 16th VIEW | 16 | ⇒ | 3 |
| 17th VIEW | 17 | ⇒ | 3 |
| 18th VIEW | 18 | ⇒ | 3 |

AUTOSTEREOSCOPIC 3D DISPLAY DEVICE

CROSS-REFERENCE TO RELATED APPLICATIONS

This application claims the benefit of Korean Patent Application No. 10-2014-0120366, filed on Sep. 11, 2014, which is hereby incorporated by reference for all purposes as if fully set forth herein.

BACKGROUND OF THE INVENTION

1. Field of the Invention

The present invention relates to a stereoscopic 3D display device, and more particularly, to a glasses-free autostereoscopic 3D display device.

2. Description of the Related Art

Three-dimensional (3D) display may be briefly defined as "all types of systems for artificially generating a 3D screen."

Here, a system may include software technologies that generate content viewable as three-dimensional images and hardware for actually implementing 3D content made by the software technologies. As described above, the system includes a software region because content configured with a particular software scheme is separately required for each stereoscopic implementation process in the case of 3D display hardware.

Furthermore, virtual 3D display (hereinafter, referred to as a stereoscopic 3D display device) may be defined as all types of systems for allowing a user to virtually experience depth in the planar display hardware using binocular disparity due to our eyes being separated from each other by about 65 mm in the horizontal direction among various factors for allowing a person to experience a three-dimensional effect. In other words, our eyes view slightly different images (strictly speaking, left and right spatial information being slightly divided) even when viewing the same object due to binocular disparity, and if those two images are transmitted to the brain through the retina, then the brain fuses two images together in a correct manner to allow us to experience depth. Using this phenomenon, a stereoscopic 3D display device implements virtual depth through a design of displaying the left and right images at the same time on a two-dimensional display device and sending them to each eye.

In order to display two channel images on a screen in the stereoscopic 3D display device, for example, each channel is outputted by changing each row in one direction (horizontal or vertical) on a screen. In this manner, when two channel images are outputted at the same time on a display device, the right image enters into the right eye and the left image enters into the left eye as they are in the case of a glasses-free type hardware structure. Furthermore, in the case of a glasses-wearing type, a method is used to hide the right image from the left eye and hide the left image from the right eye, through specific glasses suitable for this purpose.

An important factor for allowing a person to experience stereoscopic and depth effects may be binocular disparity due to a distance between two eyes, but depth effects are also closely related to psychological and memory factors. Therefore, 3D implementation methods are typically divided into a volumetric type, a holographic type, and a stereoscopic type based on the level of three-dimensional image information provided to an observer.

The volumetric type as a method of experiencing a perspective in a depth direction uses a psychological factor, and a suction effect may be applicable to 3D computer graphics in which perspective projection, overlapping, shadow, luminance, movement, and the like are shown based on corresponding calculations, and so-called IMAX cinemas in which a large-sized screen having a wide viewing angle is provided to an observer to evoke an optical illusion and create the feeling of being sucked into a space.

The holographic type, known as the most complete 3D implementation technique, may be represented by laser beam reproduction holography or white light reproduction holography.

Furthermore, the stereoscopic type as a method of experiencing a stereoscopic effect uses the binocular physiological factor. Using the brain's capacity of generating spatial information prior to and subsequent to a display plane, a stereoscopic effect is experienced when the brain combines associative images of a plane including parallex information seen by the left and right eyes, separated from each other by about 65 mm as described above, namely, stereography. The stereoscopic type may be largely divided into a glasses-wearing type and a glasses-free type.

A representative method known as the glasses-free type may include a lenticular lens mode and a parallax barrier mode in which a lenticular lens sheet on which cylindrical lenses are vertically arranged is provided at a front side of the image panel.

FIG. 1 is a view for explaining the concept of a typical lenticular lens type stereoscopic 3D display device in which a relationship between the rear surface distance (S) and the viewing distance (d) is shown.

Furthermore, FIG. 2 is a view illustrating a lenticular lens type stereoscopic 3D display device and a light profile as an example.

Here, viewing diamonds, light profiles, and view data forming a viewing zone are illustrated at the center of FIG. 2, and an actually perceived view is schematically illustrated at the bottom of FIG. 2.

Referring to FIGS. 1 and 2, a typical lenticular lens type stereoscopic 3D display device may include an upper and a lower substrate, a liquid crystal panel 10 filled with liquid crystals therebetween, a backlight unit (not shown) located on a rear surface of the liquid crystal panel 10 to irradiate light, and a lenticular lens sheet 20 located on a front surface of the liquid crystal panel 10 to implement a stereoscopic image.

The lenticular lens sheet 20 is formed with a plurality of lenticular lenses 25, an upper surface of which is made of a convex lens shaped material layer on a flat substrate.

The lenticular lens sheet 20 performs the role of dividing left-eye and right-eye images, and diamond shaped viewing diamonds (normal view zone) 30 in which images corresponding to the left-eye and right-eye are viewable by the left-eye and right-eye, respectively, are formed at an optimal 3D distance (d) from the lenticular lens sheet 20.

The width of one viewing diamond 30 is formed with the viewer's interocular distance (e) to perceive parallax images entering the viewer's left-eye and right-eye as a stereoscopic image.

Here, each viewing diamond 30 is formed with the corresponding sub-pixel view data, namely, image, of the liquid crystal panel 10.

View data denotes an image captured by cameras separated by a reference measure of the interocular distance (e).

In such a typical lenticular lens type stereoscopic 3D display device, the liquid crystal panel 10 and lenticular lens sheet 20 are supported by a mechanical body (not shown), and the liquid crystal panel 10 and lenticular lens sheet 20 are separated by a predetermined distance (rear surface distance; S).

Here, an intervening layer 26 (e.g., a gap glass) is inserted into the typical lenticular lens type stereoscopic 3D display device to constantly maintain the rear surface distance (S).

Since a lenticular lens type stereoscopic 3D display device is implemented in a multi-view mode formed based on an initially designed view map, the viewer may view a 3D image when entering a predetermined view zone.

Here, referring to a light profile measured at an optimal viewing distance (d) with reference to FIG. 2, it is seen that the intensity of light is the highest at the center of the viewing diamond 30 and gradually reduces towards the end of the viewing diamond 30. A difference between the maximum and minimum of the intensity of light may be defined as a luminance difference (LD) ($\Delta L$), and typical lenticular lens type stereoscopic 3D display devices show a large luminance difference, thereby having a significant effect on their image quality.

On the other hand, an image difference between views perceived as the user's location moves between the viewing diamonds 30 is called image flipping, and the maximum difference is perceived when moving from a normal view to a reversed view, or vice versa. Accordingly, an image difference between first view data and last view data increases as the number of views increases, thereby deteriorating the phenomenon of image flipping.

SUMMARY OF THE INVENTION

The present disclosure is to solve the foregoing problems, and an object of the present disclosure is to provide an autostereoscopic 3D display device for removing or minimizing 3D crosstalk, luminance difference, and image flipping in stereoscopic images, thereby enhancing the depth of stereoscopic images.

Other objects and features of the present invention will be described in the configuration of the invention and claims which follow hereinbelow.

In order to accomplish the foregoing object, an autostereoscopic 3D display device according to an embodiment of the present disclosure may include an image panel, a 3D filter disposed on a surface of the image panel to form a plurality of view images at a viewing distance in a corresponding plurality of overlapping viewing zones (e.g., diamond-shaped viewing zones), and an intervening layer (e.g., a gap glass) positioned between the image panel and the 3D filter that maintains a gap between the image panel and the 3D filter, wherein a width of the viewing zones is set to a proper fraction of the interocular distance (the distance between an observer's eyes). In one embodiment, the distance between the observer's eyes is estimated based on a typical distance between human eyes.

Here, the image panel includes a plurality of sub-pixels that collectively output light corresponding to a plurality of view images. The sub-pixels may be sequentially allocated with a first view through an m-th view on m sub-pixels to display the input data of multiple views, where m is a natural number.

The 3D filter may divide an optical axis of input data to form a k-th view image displayed on a k-th sub-pixel as a k-th view (where k is a natural number satisfying the condition: $1 \leq k \leq m$).

The 3D filter may include a lenticular lens sheet formed with a plurality of lenticular lenses.

In order to set the width of the viewing zones to 1/n times the interocular distance, it may be desirable to increase a thickness of the gap glass to n times or decrease a pitch of the lenticular lens to 1/n times that which would result in the width of the viewing zones being equal to the interocular distance. Thus, the distance between centers of adjacent viewing zones may also be less than the interocular distance.

The 3D filter may output a k-th view image displayed on a k-th sub-pixel as a k-th view.

An autostereoscopic 3D display device according to an embodiment of the present disclosure may further include a timing controller configured to newly map the same or similar input data between adjoining views.

The timing controller may convert the input data of corresponding to a viewing zone located between the left-eye and right-eye to a view image which is the same or similar to a view image perceived by the left-eye or right-eye.

In one embodiment, the width of the viewing zones is 1/n times the interocular distance n+(2I−3) views are concurrently perceived by a single eye and n+(2I−3) viewing zones exist between the left-eye and right-eye, where I is an integer greater than one that represents a number of other viewing zones with which a given viewing zone overlaps.

A sub-pixel perceived from the left-eye and a sub-pixel perceived from the right-eye may be spatially separated by one sub-pixel.

In one embodiment, the autostereoscopic 3D display device also includes a timing controller that groups input data into a plurality of groups. The input data in each group corresponds to a subset of the viewing zones that are adjoining The timing controller converts the input data in one or more of the groups into combined input data describing a single converted view image for the corresponding group. The image panel outputs light such that a substantially identical viewing image forms in each viewing zone corresponding to a given group.

In one embodiment, if the input data includes image data corresponding to sixteen viewing zones and each viewing zone overlaps with two other viewing zones, the timing controller groups the image data into four groups. Each group includes input data corresponding to four adjoining viewing zones. The timing controller also creates a single converted view image for each group based on the input data in that group.

In another embodiment, the groups of input data include a transition group. The timing controller creates a medium view image for the transition group based on the input data included in the groups immediately to either side of the transition group. The medium view image is an image part-way between the single converted view images of the immediately adjacent groups (e.g., half-way between the two converted view images).

In some embodiment, the number of viewing zones for which corresponding input data is included in a group is equal to or less than the product of an overlapping number of viewing zones and the quotient of the interocular distance and the width of the viewing zones. In one such embodiment, if the number of viewing zones for which corresponding input data is included in a group is less than the product of the overlapping number of viewing zones and the quotient of the interocular distance and the width of the viewing zones, input data of a medium view image is entered between two adjoining groups. The medium view image is half-way between the single converted view images of the adjoining groups between which it is inserted.

In one embodiment, the total number of the views is equal to or less than the product of (N+1), a number of overlapping viewing zones, and the quotient of the interocular distance and the width of the viewing zones, where N is a natural number.

As described above, an autostereoscopic 3D display device according to one embodiment of the present disclosure may set the width of a viewing zone to a/n times (where a and n are natural numbers satisfying the condition: a<n) the interocular distance while at the same time overlapping the viewing zones with each other as well as newly mapping the same or similar input data between adjoining views through a view data rendering process.

As a result, it may be possible to provide an effect of removing or minimizing 3D crosstalk, luminance difference, and image flipping in stereoscopic images, thereby enhancing the depth of stereoscopic images.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 15 is a view illustrating input data input to the pixel array illustrated in FIG. 14, according to the first embodiment of the present disclosure illustrated in FIG. 5;

FIG. 16 is a view illustrating an example of converting input data through view data rendering, according to one embodiment;

FIG. 20 is a view illustrating input data input to a pixel array in an autostereoscopic 3D display device, according to the second embodiment of the present disclosure illustrated in FIG. 7, as an example;

FIG. 21 is a view illustrating an example of converting input data through view data rendering, according to one embodiment;

FIG. 22 is a view illustrating input data input to a pixel array in an autostereoscopic 3D display device, according to the second embodiment of the present disclosure illustrated in FIG. 7, as another example;

FIG. 23 is a view illustrating another example of converting input data through view data rendering, according to one embodiment;

FIG. 27 is a view illustrating a pixel array written with a view map and a lenticular lens layout in an autostereoscopic 3D display device, according to the second embodiment of the present disclosure illustrated in FIG. 8, as an example;

FIG. 28 is a view illustrating input data input to the pixel array illustrated in FIG. 27, according to the second embodiment of the present disclosure illustrated in FIG. 8;

FIG. 29 is a view illustrating an example of converting input data through view data rendering, according to one embodiment;

FIG. 30 is a view illustrating input data input to a pixel array in an autostereoscopic 3D display device, according to the second embodiment of the present disclosure illustrated in FIG. 8, as another example;

FIG. 31 is a view illustrating another example of converting input data through view data rendering, according to one embodiment;

DETAILED DESCRIPTION

Figure 1:
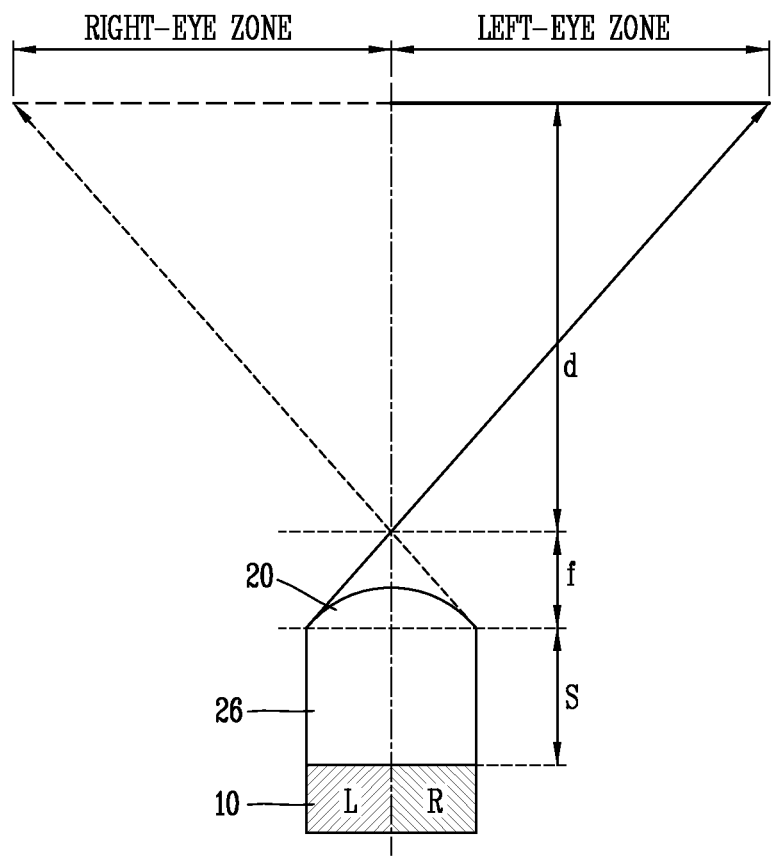
FIG. 1 is a view for explaining the concept of a typical lenticular lens type stereoscopic 3D display device.

Hereinafter, preferred embodiments of the present invention will be described in detail with reference to the accompanying drawings to such an extent that the present invention can be easily embodied by a person having ordinary skill in the art to which the present invention pertains.

Advantages and features of the present disclosure, and methods of accomplishing the same, will be clearly understood with reference to the following embodiments described in detail in conjunction with the accompanying drawings. However, the present disclosure is not limited to those embodiments disclosed below but may be implemented in various different forms. It should be noted that the present embodiments are merely provided to make a full disclosure of the invention and also to allow those skilled in the art to know the full range of the invention, and therefore, the present invention is to be defined only by the scope of the appended claims. Further, like reference numerals refer to like or similar elements throughout the specification. In the drawings, the size and relative size of layers and regions may be exaggerated for the clarity of the description.

Furthermore, an element or layer referred to as being "on" another element or layer may include both a case where it is directly on the another element or layer and a case where a further element or layer is interposed therebetween. On the contrary, an element referred to as being "directly on" another element indicates a case where a further element or layer is not interposed therebetween.

Spatially relative terms such as "below", "beneath", "lower", "above", or "upper" may be used herein to describe a correlation between one device or constituent element and other devices or constituent elements as illustrated in the drawings. It will be understood that spatially relative terms are intended to include a different direction of the device during the use or operation in addition to its direction illustrated in the drawings. For example, when a device in the drawing is turned over, the device described as "below" or "beneath" another device will be placed "above" the another device. Accordingly, the exemplary terms "below" or "beneath" may include both directions of above and below. Since the device may be oriented in another direction, the spatially relative terms may be interpreted in accordance with the orientation thereof It should be noted that the terms used herein are merely used to describe the embodiments, but not to limit the present invention. In the present specification, unless clearly used otherwise, expressions in a singular form include a plural form. The term "comprises" and/or "comprising" used in the specification intend to express a constituent element, a step, an operation, and/or a device and does not exclude the existence or addition of one or more other constituent elements, steps, operations, and/or devices.

Figure 3:
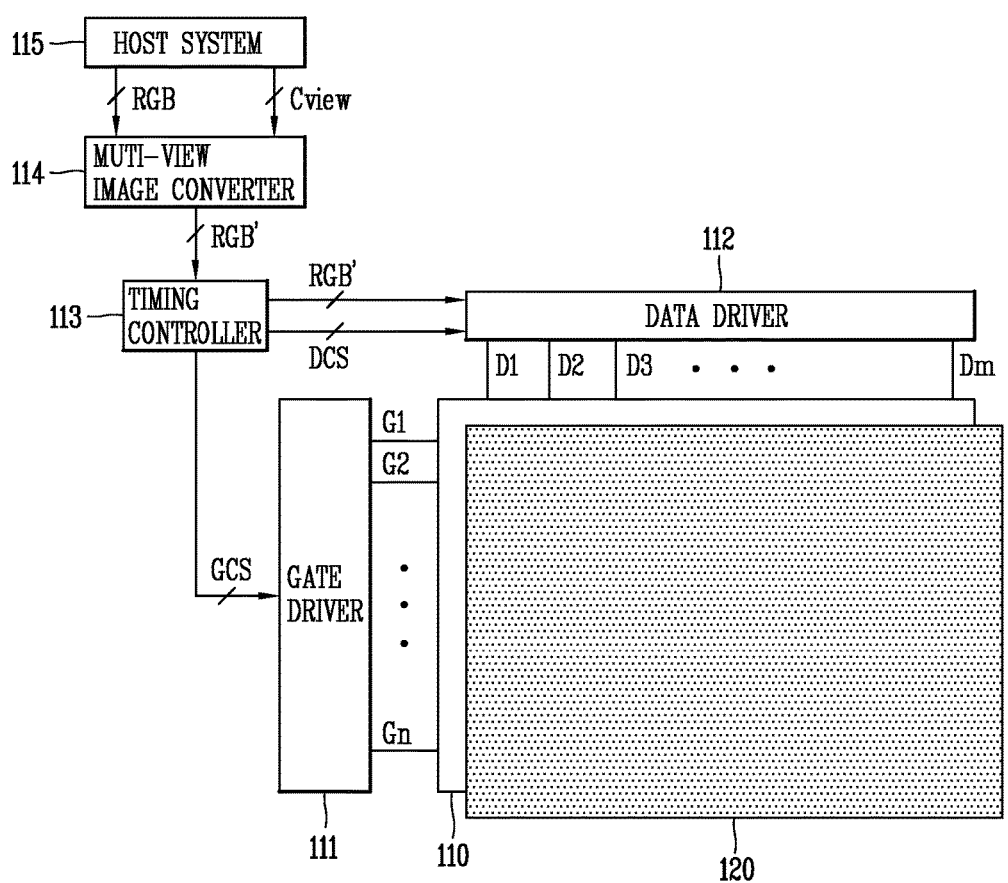
FIG. 3 is a block diagram schematically illustrating the configuration of an autostereoscopic 3D display device, according to one embodiment of the present disclosure.

FIG. 3 is a block diagram schematically illustrating the configuration of one embodiment of an autostereoscopic 3D display device according to the present disclosure.

Referring to FIG. 3, an autostereoscopic 3D display device according to one embodiment of the present disclosure may largely include an image panel 110, an image panel driver 111, 112, a 3D filter 120, a filter driver (not shown), and a timing controller 113.

The stereoscopic 3D display device may be implemented as a flat display device such as any one of a liquid crystal display (LCD), an organic light emitting display device (OLED), a field emission display (FED), a plasma display panel (PFP), an electroluminescent display (EL), and the like. The present disclosure illustrates a case where the image panel 110 is configured with a liquid crystal display device in the following embodiment, but is not limited to this.

Here, a plurality of sub-pixels displaying red, green, and blue are formed on the image panel 110, and the sub-pixels are divided into left-eye pixels and right-eye pixels displaying a left-eye image and a right-eye image, respectively, to collectively output light corresponding to a stereoscopic image, which is formed in the viewing zones with the operation of the 3D filter 120.

For an example, when the image panel 110 is configured with a liquid crystal display device, the present disclosure may be applicable regardless of its liquid crystal mode including a twisted nematic (TN) mode, an in-plane switching (IPS) mode, a fringe field switching (FFS) mode, and a vertical alignment (VA) mode.

Here, though not shown in the drawing, the image panel 110 may be largely configured with a color filter substrate, an array substrate, and a liquid crystal layer formed between the color filter substrate and the array substrate.

The color filter substrate may include a color filter configured with a plurality of sub-color filters implementing red, green, and blue, a black matrix (BM) configured to divide between the sub-color filters for blocking light passing through the liquid crystal layer, and a transparent common electrode for applying a voltage to the liquid crystal layer.

The array substrate may include a plurality of gate lines (G1, G2, G3, . . . , Gn) and data lines (D1, D2, D3, . . . , Dm) defining a plurality of pixel regions, a thin film transistor which is a switching element formed at an intersection region of the gate line (G1, G2, G3, . . . , Gn) and data line (D1, D2, D3, . . . , Dm), and a pixel electrode formed on the pixel region.

The thin film transistor may include a gate electrode connected to the gate line (G1, G2, G3, . . . , Gn), a source electrode connected to the data line (D1, D2, D3, . . . , Dm), and a drain electrode electrically connected to the pixel electrode. Furthermore, the thin film transistor may include a gate insulating layer for insulating between the gate electrode and the source/drain electrode, and an active layer for forming a conductive channel between the source electrode and the drain electrode for a gate voltage supplied to the gate electrode.

An upper polarizer is adhered to an outer surface of the color filter substrate, and a lower polarizer is adhered to an outer surface of the array substrate. A light transmitting axis of the upper polarizer and a light transmitting axis of the lower polarized may be formed to be perpendicular to each other. Furthermore, an alignment layer for configuring a pre-tilt angle of the liquid crystal layer is formed on an inner surface of the color filter substrate and array substrate, and a spacer for maintaining a cell gap of the liquid crystal cell is formed between the color filter substrate and array substrate.

The image panel 110 having the foregoing configuration displays an image under the control of the timing controller 113.

The image panel 110 may display a 2D image in a 2D mode and a multi-view image in a 3D mode, under the control of the timing controller 113.

A view of a stereoscopic image may be generated by allowing cameras to be separated by a viewer's interocular distance and capturing an image for an object. For an example, when an object is captured using nine cameras, the image panel 110 may display nine views of a stereoscopic image.

The image panel driver 111, 112 may include a gate driver 111 for supplying data voltages for 2D/3D images to the data line (D1, D2, D3, . . . , Dm) of the image panel 110 and a data driver 112 for sequentially supplying a scan pulse (or gate pulse) to the gate lines (G1, G2, G3, . . . , Gn) of the image panel 110. The image panel driver 111, 112 spatially distributes and writes the left-eye and right-eye data input as data having a multi-view image data format in a 3D mode on the sub-pixels of the image panel 110.

The timing controller 113 receives timing signals such as a data enable (DE) signal, a dot clock (CLK), and the like to generate control signals (GCS, DCS) for controlling the operation timing of the gate driver 111 and data driver 112.

In other words, the timing controller 113 may drive the image panel 110 with a predetermined frame frequency based on image data and timing signals received from a multi-view image converter 114 (or host system 115), and generate a gate control signal (GCS) and a data control signal (DCS) based on the predetermined frame frequency. The timing controller 113 supplies the gate control signal (GCS) to the gate driver 111, and supplies image data (R, G, B) and the data control signal (DCS) to the data driver 112.

The gate control signal (GCS) for controlling the gate driver 111 may include a gate start pulse, a gate shift clock, a gate output enable signal, and the like. The gate start pulse controls the timing of a first gate pulse. The gate shift color is a clock signal for shifting the gate start pulse. The gate output enable signal controls the output timing of the gate driver 111.

The data control signal (DCS) for controlling the data driver 112 may include a source start pulse, a source sampling clock, a source output enable signal, a polarity control signal, and the like. The source start pulse controls a data sampling start time point of the data driver 112. The source sample clock is a clock signal for controlling the sampling operation of the data driver 112 based on a rising or falling edge. If digital video data to be input to the data driver 112 is transmitted with the mini low voltage differential signalling (LVDS) interface standard, the source start pulse and source sample clock may be omitted. The polarity control signal reverses the polarity of a data voltage output from the data driver 112 for L horizontal periods (where L is a natural number). The source output enable signal controls the output timing of the data driver 112.

The data driver 112 may include a plurality of source drive integrated circuits (ICs). The source drive ICs convert image data (R, G, B) received from the timing controller 113 into a positive/negative gamma compensation voltage to generate positive/negative analog data voltages. The positive/negative analog data voltages output from the source drive ICs are supplied to data lines (D1, D2, D3, . . . , Dm) of the image panel 110.

The gate driver 111 may include one or more gate drive ICs. The gate driver 111 may include a shift register, a level shifter for converting an output signal of the shift register to a swing width suitable for the operation of a TFT of the liquid crystal cell, an output buffer, and the like. The gate driver 111 sequentially supplies a gate pulse synchronized with a data voltage to the gate lines (G1, G2, G3, . . . , Gn) of the image panel 110 under the control of the timing controller 113.

In particular, the timing controller 113 according to one embodiment of the present disclosure may perform the role of newly mapping input data for each sub-pixel of the image panel 110 through a view data rendering process. It may be possible to eliminate or reduce the perceived 3D crosstalk as well as to enhance the viewing angle d by newly mapping the same or similar input data between adjoining views.

According to the foregoing configuration, the multi-view image converter 114 receives image data and view control signals from the host system 115. The multi-view image converter 114 may determine the number of views of a stereoscopic image according to a view control signal.

The multi-view image converter 114 converts image data into a format suitable to a set number of views according to a view control signal.

The host system 115 supplies image data, timing signals, and the like to the multi-view image converter 114 through an interface such as a low voltage differential signalling (LVDS) interface, a transition minimized differential signalling (TMDS) interface, or the like. The host system 115 supplies 3D image data including left-eye image data and right-eye image data to the multi-view image converter 114. As described above, the timing signals may include a vertical synchronization signal, a horizontal synchronization signal, a data enable signal, a dot clock, and the like.

The host system 115 receives viewer sensing information from a viewer sensing device, for example, an image collection unit, and calculates an optimal number of views according to the viewer sensing information. The host system 115 generates a view control signal according to the optimal number of views and supplies it to the multi-view image converter 114. The host system 115 may receive a number of viewers of the viewer sensing information as an input address to generate a view control signal using a lookup table for outputting a number of views stored in the relevant input address. Thus, if there is a large number of viewers, a large number of views can be outputted so that each viewer perceives a 3D image. In contrast, where there are fewer viewers, less views can be output to reduce the crosstalk between adjacent views.

Next, as a medium for optically dividing the path of an image, the 3D filter 120 performs the role of forming a light transmitting region and a light blocking region for transmitting or blocking a left-eye image and a right-eye image output from the left-eye pixel and right-eye pixel of the image panel 110, respectively.

The 3D filter 120 may be formed in various ways using well-known technologies such as a lenticular lens or barrier in the following. The lenticular lens and barrier may be implemented with a switchable lens or switchable barrier that is electrically controlled using a liquid crystal panel. The present applicant has proposed a switchable lens or switchable barrier through U.S. patent application Ser. Nos. 13/077,565 and 13/325,272, Korean Patent Application No. 10-2010-0030531, and the like.

Figure 4:
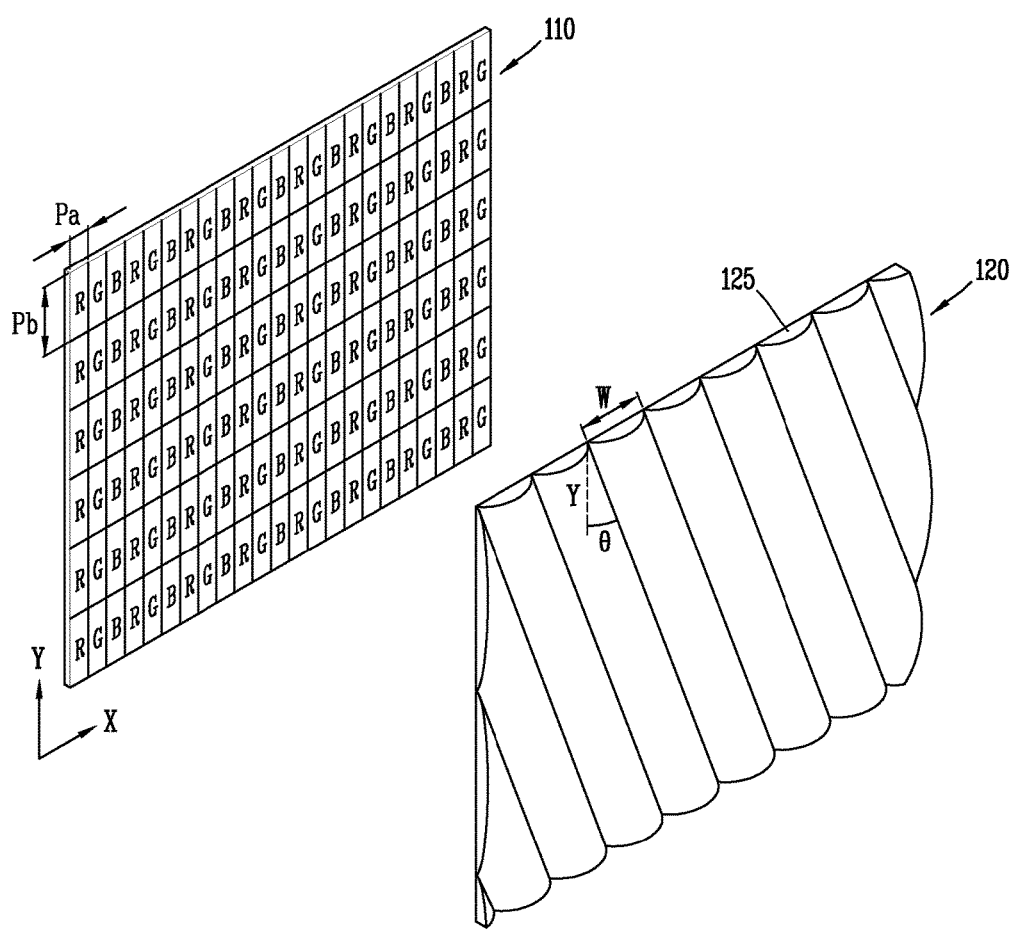
FIG. 4 is a perspective view schematically illustrating an autostereoscopic 3D display device, according to one embodiment of the present disclosure.

FIG. 4 is a perspective view schematically illustrating an autostereoscopic 3D display device according to one embodiment of the present disclosure.

Referring to FIG. 4, in a lenticular lens type stereoscopic 3D display device according to one embodiment of the present disclosure, a lenticular lens sheet 120, which is a 3D filter, including a plurality of lenticular lenses 125 having a predetermined width (w) is disposed on a front surface of the image panel 110 disposed with a plurality of sub-pixels (R, G, B).

The lenticular lens sheet 120 is formed with a plurality of lenticular lenses, an upper surface of which is made of a convex lens shaped material layer on a flat substrate.

The lenticular lens sheet 120 performs the role of dividing left-eye and right-eye images, and viewing diamonds (normal view zone) 30 in which images corresponding to the left-eye and right-eye are normally incident on the left-eye and right-eye, respectively, and are formed at an optimal viewing distance (d) from the lenticular lens sheet 120.

Accordingly, an image that has transmitted through the image panel 110 passes through the lenticular lens sheet 120 to finally form different image groups at the viewer's left-eye and right-eye so the viewer experiences a three-dimensional stereoscopic image.

In the lenticular lens type stereoscopic 3D display device, the image panel 110 and lenticular lens sheet 120 are supported by a mechanical body (not shown), and the image panel 110 and lenticular lens sheet 120 are separated by a predetermined distance (rear surface distance).

On the other hand, according to one embodiment of the present disclosure, the layout of a plurality of lenticular lenses 125 is disposed in the form of being inclined at a first angle (Θ) with respect to a longitudinal direction (y-axis direction) of the sub-pixels (R, G, B), and a horizontal width (w) along a transverse direction (x-axis direction) of the sub-pixels (R, G, B) of the lenticular lens 125 may be set to an integer multiple of the sub-pixels (R, G, B).

In other words, in a stereoscopic 3D display device according to one embodiment of the present disclosure, the lenticular lenses 125 provided on the lenticular lens sheet 120 may be disposed to be inclined at a first angle (Θ) with reference to a longitudinal direction of the sub-pixels (R, G, B).

Accordingly, the number of views for viewing a 3D image may be adjusted by the layout of the lenticular lens sheet 120 inclined with respect to the image panel 110 displaying a 2D image.

The first angle (Θ) inclined with reference to the longitudinal direction of the sub-pixels (R, G, B) of the lenticular lens 125 is expressed as an equation of $\tan^{-1}((M*Pa)/(N*Pb))$.

Here, Pa is a minor axis pitch of the sub-pixels (R, G, B), and Pb is a major axis pitch of the sub-pixels (R, G, B), wherein M and N are natural numbers, and defined as a number of sub-pixels (R, G, B) in a transverse direction of the sub-pixels (R, G, B) and a number of sub-pixels (R, G, B) in a longitudinal direction of the sub-pixels (R, G, B), respectively, within a group when the lenticular lens 125 passes through a vertex of one group in a correct diagonal direction in the case where a plurality of sub-pixels (R, G, B) are configured with one group. Here, M and N typically satisfy the value of M/N≤2.

Here, a number given to a plurality of sub-pixels (R, G, B) located within one group is a number of views defined as a 3D image viewable zone of the stereoscopic 3D display device in which the lenticular lenses 125 of the lenticular lens sheet 120 are disposed at the first angle (Θ), and a number given to each view is a sub-pixel (R, G, B) that is seen during 3D image viewing.

A stereoscopic 3D display device having the lenticular lens sheet 120 according to embodiments of the present disclosure may have an effect of enhancing luminance, and also have an effect of enhancing viewing angle for 3D image viewing through an increase of the number of views.

An increase of the number of views is carried out by applying a structure in which the lenticular lens 125 provided in the lenticular lens sheet 120 is disposed to have a predetermined angle with reference to a longitudinal direction of the sub-pixels (R, G, B), namely, a slanted structure. The application of the slanted structure may prevent resolution from being deteriorated in one direction.

On the other hand, according to embodiments of the present disclosure, a viewing diamond may be configured to overlap with an adjoining viewing diamond to enhance the luminance difference of a stereoscopic image, as will be described in detail through the following first embodiment of the present disclosure.

Figure 5:
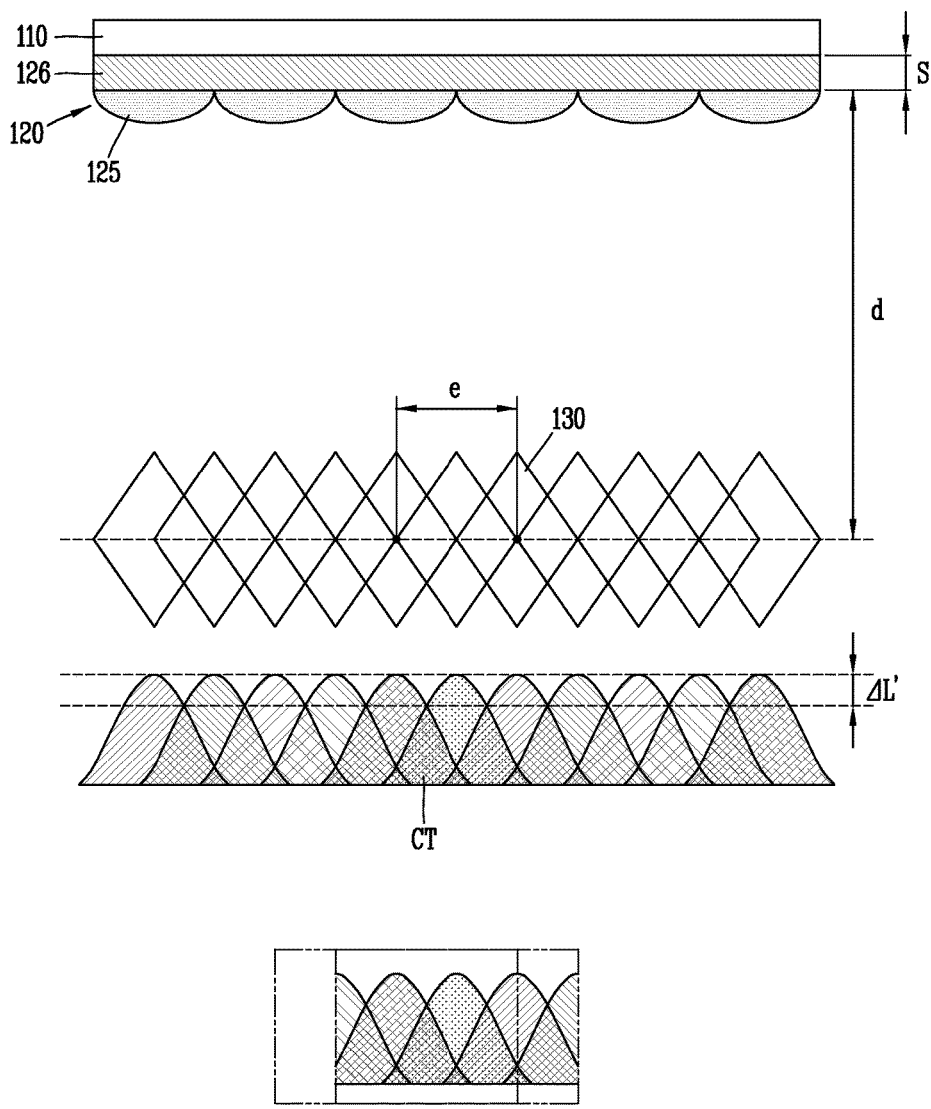
FIG. 5 is a view illustrating an autostereoscopic 3D display device and a light profile, according to a first embodiment of the present disclosure, as an example.

FIG. 5 is a view illustrating an autostereoscopic 3D display device and a light profile, according to a first embodiment of the present disclosure, as an example.

Here, viewing diamonds, light profiles, and view data forming a viewing zone are illustrated at the center of FIG. 5, and an actually perceived view is schematically illustrated at the bottom of FIG. 5. For reference, view data may be divided using hatching, and the same hatching denotes the same view data.

Referring to FIG. 5, an autostereoscopic 3D display device according to a first embodiment of the present disclosure may include an image panel 110 and a lenticular lens sheet 120 as a 3D filter located on a front surface of the image panel 110 to implement a stereoscopic image.

Here, the image panel 110 and lenticular lens sheet 120 are supported by a mechanical body (not shown), and the image panel 110 and lenticular lens sheet 120 are separated by a predetermined distance (rear surface distance, S) by a gap glass 126.

The lenticular lens sheet 120 is formed with a plurality of lenticular lenses 125, an upper surface of which is made of a convex lens shaped material layer on a flat substrate, but the present disclosure is not limited to this.

The 3D filter may also be formed in various ways using well-known technologies such as a barrier other than the lenticular lens sheet 120.

The lenticular lens sheet 120 performs the role of dividing left-eye and right-eye images, and diamond shaped viewing diamonds (normal view zone) 130 in which images corresponding to the left-eye and right-eye are normally incident on the left-eye and right-eye, respectively, are formed at an optimal 3D viewing distance (d) from the lenticular lens sheet 120.

In other words, the lenticular lens sheet 120 may allow light emitted from each sub-pixel of the image panel 110 to be directed to different image groups at the viewer's left-eye and right-eye to form a viewing zone at an optimal viewing distance (d). The shape has a typical diamond form, and thus is referred to as a viewing diamond 130.

The width of a viewing diamond 130 is formed with the size of a viewer's interocular distance (e) to receive images having a disparity at the viewer's left-eye and right-eye such that the viewer perceives it as a stereoscopic image.

Here, the view data, namely, image, of the corresponding sub-pixel of the image panel 110, is formed in each viewing diamond 130.

View data denotes an image captured with a camera separated by a reference measure of the interocular distance (e). For example, when configured with nine views, images captured with nine cameras are applied to a first through a ninth view, respectively, in the viewing diamond 130, and the second view is relatively located at the right or left side compared to the first view, and has a directivity. The relevant view data is reflected and repeatedly formed on the viewing diamond 130.

Here, referring to a light profile measured at an optimal viewing distance (d) as described above, it is seen that the intensity of light is the highest at the center of the viewing diamond 130 and gradually reduced towards an end of the viewing diamond 130.

However, in the case of the first embodiment of the present disclosure, it is seen that a luminance difference (ΔL') is greatly reduced compared to the related art when configured to overlap the viewing diamonds 130 with each other compared to a lenticular lens type stereoscopic 3D display device in the related art.

Here, the first embodiment of the present disclosure illustrated in FIG. 5 is configured with two overlapping viewing diamonds 130 as an example, but the present disclosure is not limited to this, and three or more overlapping views may be allowed between the viewing diamonds 130. Here, the embodiment with two overlapping views has a structure in which another viewing diamond 130 is inserted between two adjoining viewing diamonds 130.

Here, the size and width of a light profile in each view are affected by the image panel 110, lenticular lens sheet 120, light source, optical sheet, and the like, and the size of a region overlapping with the light profile of a view corresponding to the adjoining viewing diamond 130 corresponds to 3D crosstalk (CT).

In other words, in the ideal case, only the information of that view may be seen on the viewing diamond 130 (for example, only an L-view is seen and a R-view is not seen from the left-eye), but in the case of a view overlapping structure, an R-view other than the L-view may be also dimly seen from the left-eye to generate 3D crosstalk (CT).

As described above, in the case of an autostereoscopic 3D display device according to a first embodiment of the present disclosure, it is seen that luminance difference is greatly reduced but 3D crosstalk is increased. In other words, the luminance difference and 3D crosstalk have a trade-off relationship with each other.

Furthermore, as 3D crosstalk is increased, 3D depth perceived by a viewer is also deteriorated, blurring the image.

In this case, the view data of an adjoining view may be replaced to reduce 3D crosstalk received by the viewer, but the size, namely the width of the viewing diamond 130, is formed with the interocular distance, and thus the right-eye is affected when view data is replaced based on the left-eye, and the left-eye is affected when view data is replaced based on the right-eye.

As a result, according to a second and a third embodiment of the present disclosure, the width of a viewing diamond is set to a/n times (where a and n are natural numbers satisfying the condition: a<n) the interocular distance to be less than the interocular distance i.e., the width of the viewing diamond is a proper fraction of the interocular distance. At the same time, the viewing diamonds are overlapped with each other, as will be described in detail with reference to the accompanying drawings.

In general, a viewing distance (2.5H-3H, where H is a height of the image panel) of a stereoscopic 3D display device is determined by a size of the image panel of the stereoscopic 3D display device.

There are largely two methods for reducing the width of a viewing diamond at a viewing distance to be less than the interocular distance, and the second embodiment of the present disclosure is a method of increasing the rear surface distance and fine-tuning the lens pitch to reduce the width of a viewing diamond while maintaining the viewing diamond between the foregoing two methods.

Figure 6:
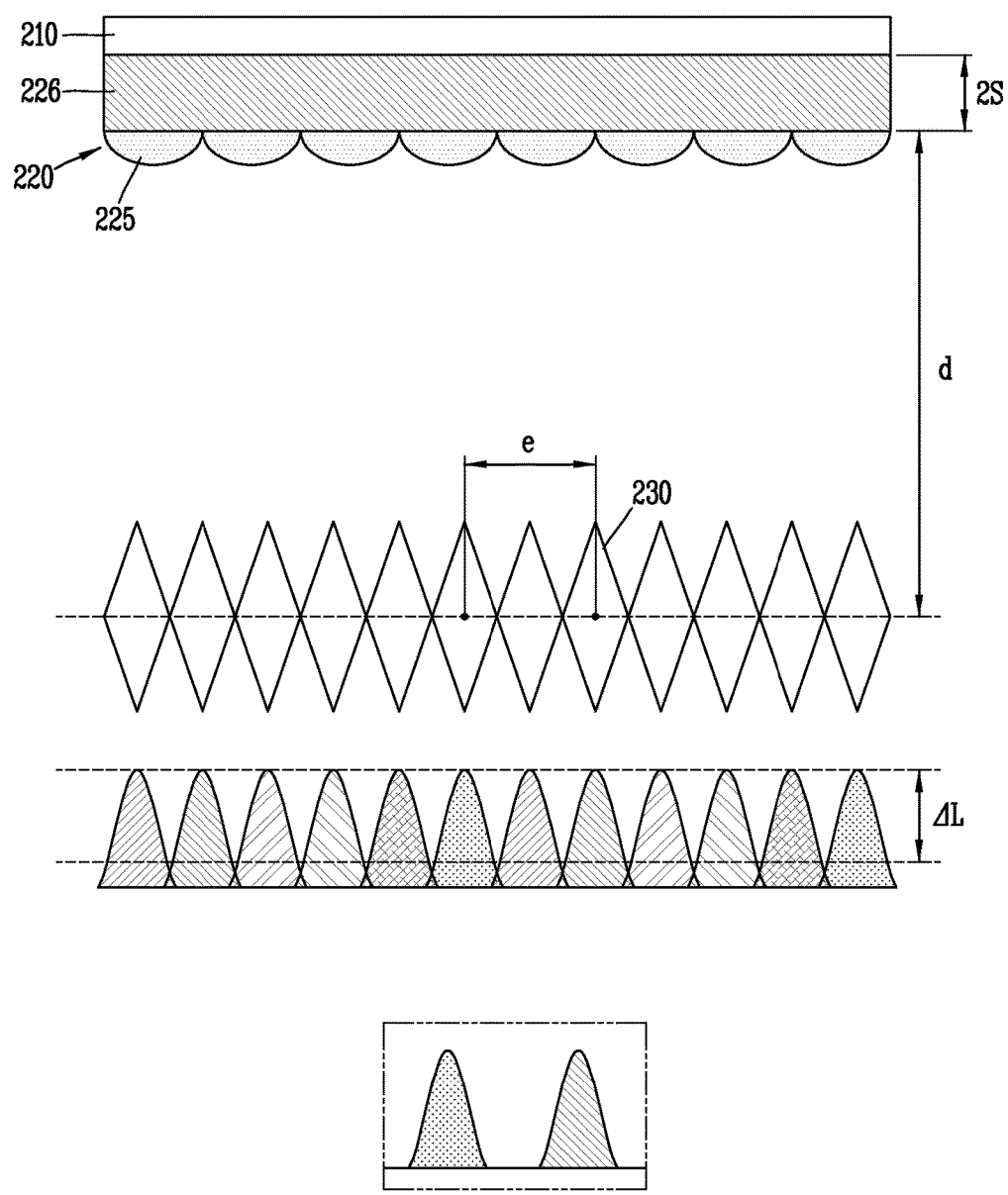
FIG. 6 is a view illustrating an autostereoscopic 3D display device and a light profile, according to a second embodiment of the present disclosure, as an example.

FIG. 6 is a view illustrating an autostereoscopic 3D display device and a light profile, according to a second embodiment of the present disclosure, as an example, in which the width of a viewing diamond is set to half the interocular distance.

Figure 7:
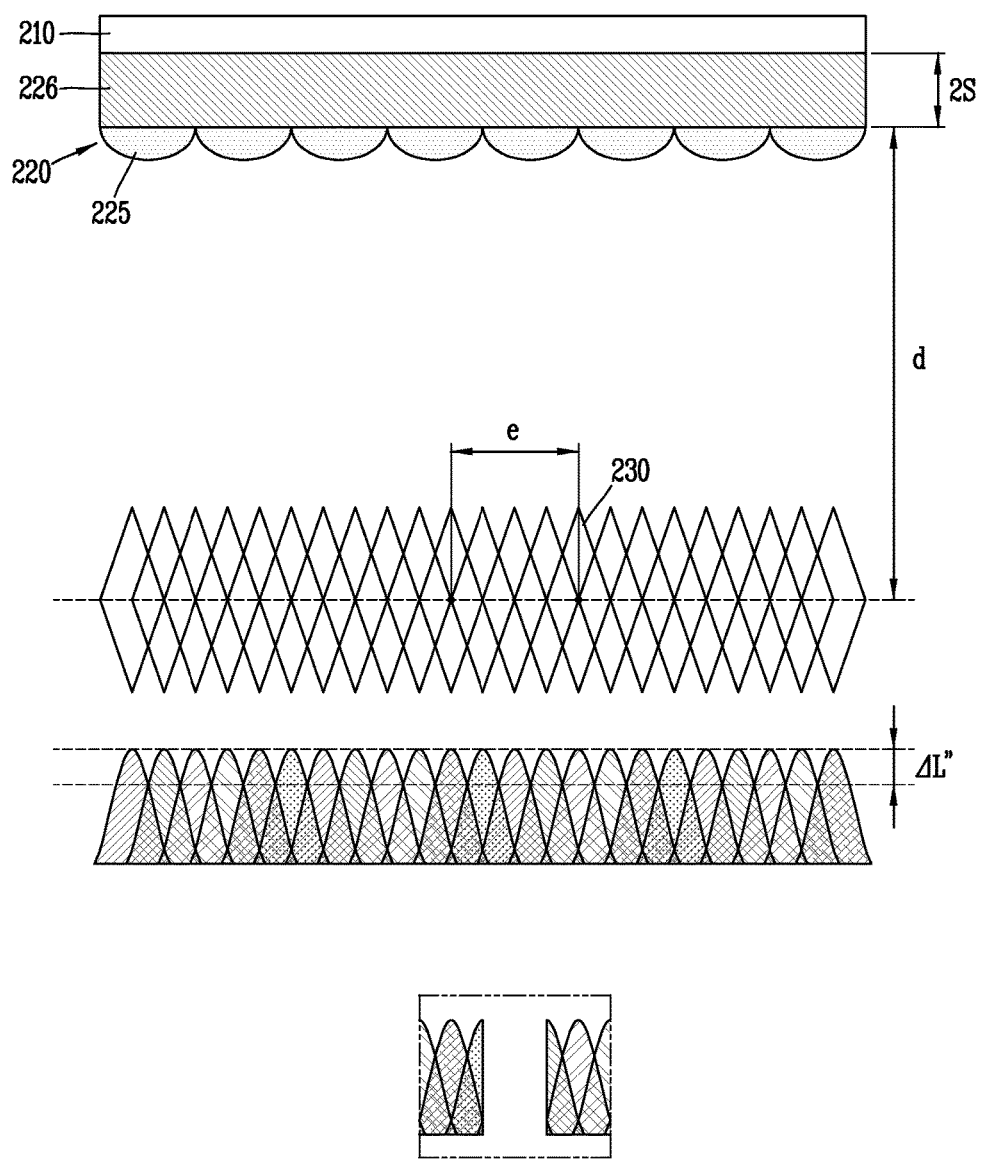
FIG. 7 is a view illustrating a view overlapping structure of an autostereoscopic 3D display device and a light profile, according to a second embodiment of the present disclosure, as an example.
Figure 8:
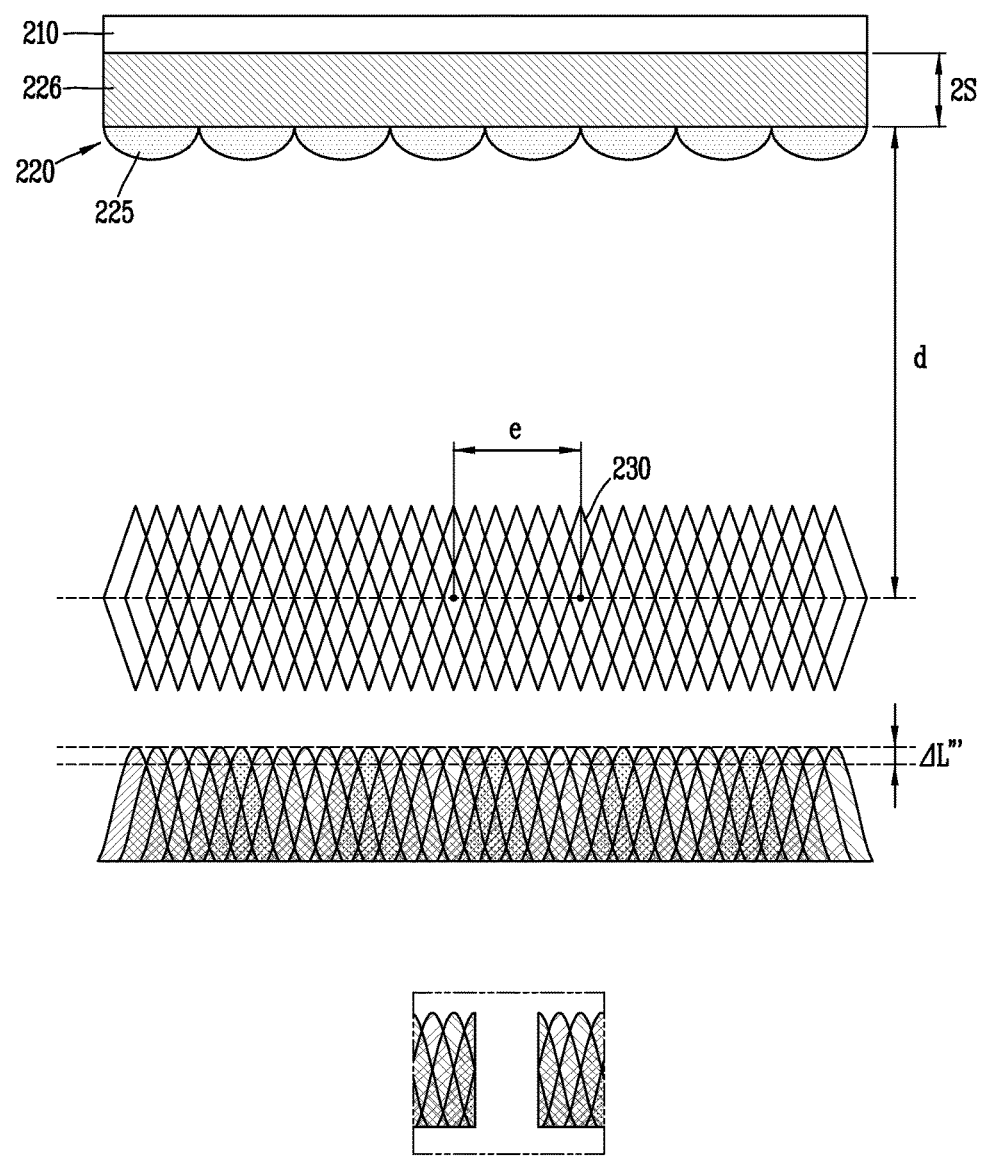
FIG. 8 is a view illustrating another view overlapping structure of an autostereoscopic 3D display device and a light profile, according to a second embodiment of the present disclosure, as an example.

Furthermore, FIGS. 7 and 8 are views illustrating a view overlapping structure of an autostereoscopic 3D display device and a light profile, according to the second embodiment of the present disclosure illustrated in FIG. 6, as an example.

Here, FIGS. 7 and 8 illustrate a two overlapping views structure and a three overlapping views structure, respectively, as an example.

As described above, viewing diamonds, light profiles, and view data forming a viewing zone are illustrated at the center of FIGS. 6, 7, and 8, and an actually perceived view is schematically illustrated at the bottom of FIGS. 6, 7, and 8. For reference, view data may be divided using hatching, and the same hatching denotes the same view data.

Referring to FIGS. 6, 7, and 8, an autostereoscopic 3D display device according to the second embodiment of the present disclosure may include an image panel 210 and a lenticular lens sheet 220 as a 3D filter located on a front surface of the image panel 210 to implement a stereoscopic image.

Here, the image panel 210 and lenticular lens sheet 220 are supported by a mechanical body (not shown), and the image panel 210 and lenticular lens sheet 220 may be separated by a predetermined distance (rear surface distance, 2S) by a gap glass 226.

The lenticular lens sheet 220 is formed with a plurality of lenticular lenses 225, an upper surface of which is made of a convex lens shaped material layer on a flat substrate, but the present disclosure is not limited to this.

The 3D filter may also be formed in various ways using well-known technologies such as a barrier other than the lenticular lens sheet 220.

The lenticular lens sheet 220 performs the role of dividing left-eye and right-eye images, and diamond shaped viewing diamonds (normal view zone) 230 in which images corresponding to the left-eye and right-eye are incident on the left-eye and right-eye, respectively, are formed at an optimal 3D viewing distance (d) from the lenticular lens sheet 220.

Here, according to the second embodiment of the present disclosure, the width of a viewing diamond 230 may be set to half the viewer's interocular distance (e). However, the present disclosure is not limited to this, and the width of the viewing diamond 230 may be also set to a/n times (where a and n are natural numbers satisfying the condition: a<n) the interocular distance to be less than the interocular distance (e).

Through this, a mutual influence between the viewing diamonds 230 located at the viewer's both eyes may be decreased to eliminate or reduce 3D crosstalk.

In order to reduce the width of the viewing diamond 230 at the same viewing distance (d) to be less than the interocular distance (e), according to the second embodiment of the present disclosure, the second rear surface distance (2S) may be increased compared to the related art. Here, there is a trade-off relationship in which as the width of the viewing diamond 230 at the same viewing distance (d) is decreased to ½, ⅓, ¼, . . . , 1/n, the rear surface distance may be increased to 2S, 3S, 4S, . . . , nS.

At the same time, the second embodiment of the present disclosure may be configured to overlap two or three viewing diamonds 230. Through this, the luminance difference (ΔL", ΔL') due to a change in the viewer's location may also be reduced.

Here, the view data, namely, image, of the corresponding sub-pixel of the image panel 210, is formed in each viewing diamond 230.

View data denotes an image captured with a camera separated by a reference measure of the interocular distance (e). For example, when configured with nine views, images captured with nine cameras are applied to a first through a ninth view, respectively, in the viewing diamond 230, and the second view is relatively located at the right or left side compared to the first view, and has a directivity. The relevant view data is reflected and repeatedly formed on the viewing diamond 230.

Here, referring to a light profile measured at an optimal viewing distance (d) as described above, it is seen that the intensity of light is the highest at the center of the viewing diamond 230 and gradually reduces towards an end of the viewing diamond 230.

However, in the case of the second embodiment of the present disclosure, increasing an overlapping number of viewing diamonds 230 to two or three, as illustrated in FIGS. 7 and 8, greatly reduces the luminance difference (ΔL", ΔL'''), but 3D crosstalk is relatively increased.

Furthermore, the viewing angle (or horizontal viewing width) is reduced compared to the foregoing embodiment of the present disclosure as the viewing diamond 230 is set to be less than the interocular distance (e), but part of the viewing diamond 230 formed between the viewer's left-eye and right-eye does not affect either of the viewer's eyes.

Accordingly, when a light source having the same characteristics is used, an interference between the viewing diamonds 230 is reduced, and thus the totally accumulated 3D crosstalk is relatively reduced compared to the foregoing embodiment of the present disclosure.

For another method for reducing the width of a viewing diamond at the same viewing distance to be less than the interocular distance, there is a method of increasing horizontal resolution, as will be described in detail through a third embodiment of the present disclosure in the following.

Here, a third embodiment of the present disclosure is configured with substantially the same configuration as that of the foregoing second embodiment of the present disclosure, excluding that a pitch of the lenticular lens is reduced instead of increasing the rear surface distance.

Figure 9:
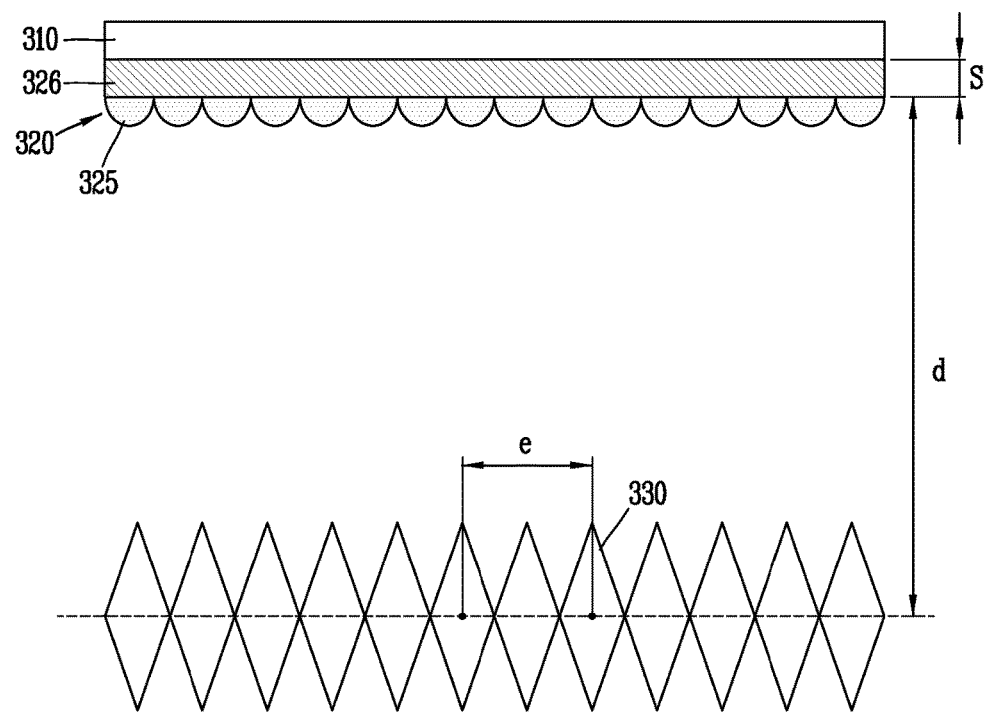
FIG. 9 is a view illustrating an autostereoscopic 3D display device and a light profile, according to a third embodiment of the present disclosure, as an example.

FIG. 9 is a view illustrating an autostereoscopic 3D display device and a light profile according to the third embodiment of the present disclosure, in which when the horizontal resolution is two times greater, a pitch of the lenticular lens is set to about half that expected from the related art, as an example.

Figure 10:
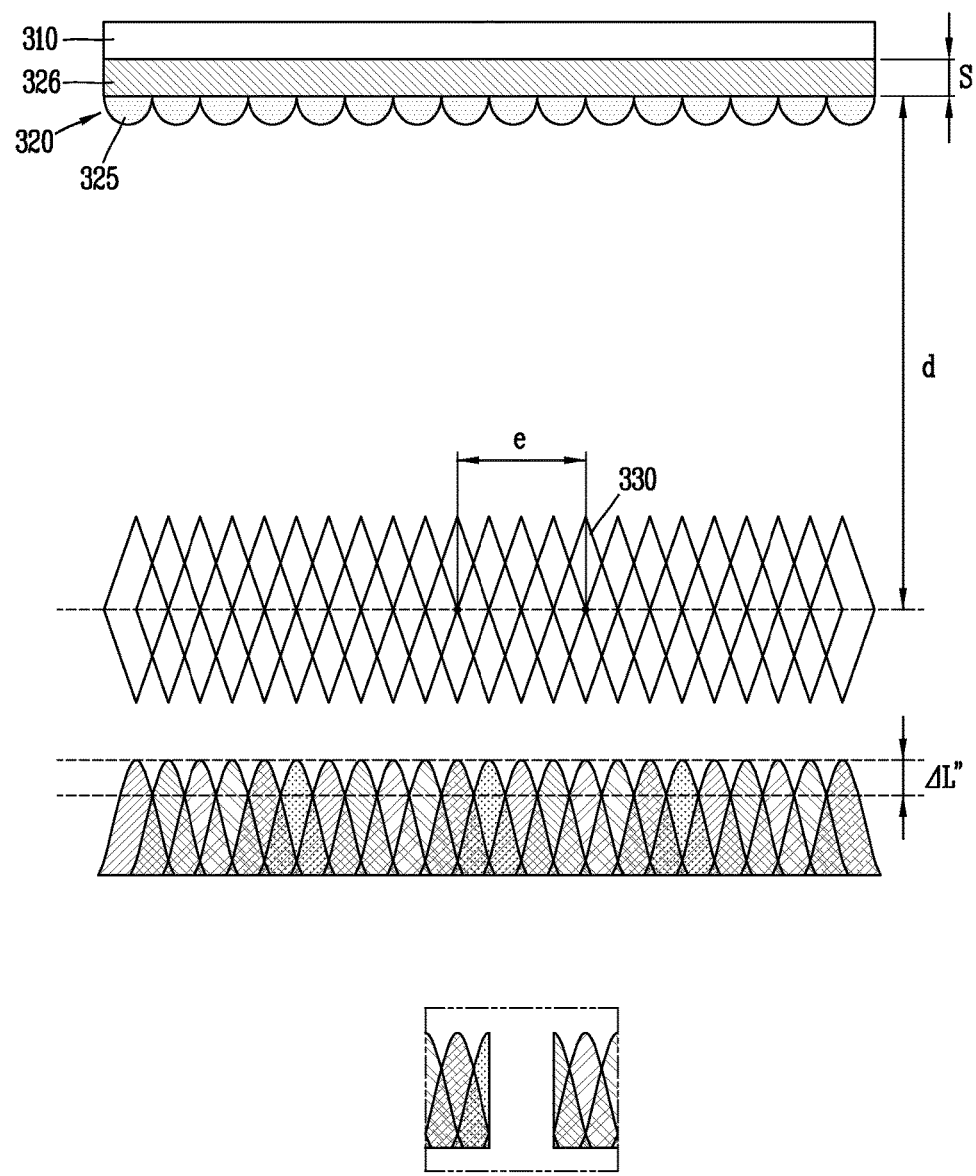
FIG. 10 is a view illustrating a view overlapping structure of an autostereoscopic 3D display device and a light profile, according to a third embodiment of the present disclosure, as an example.
Figure 11:
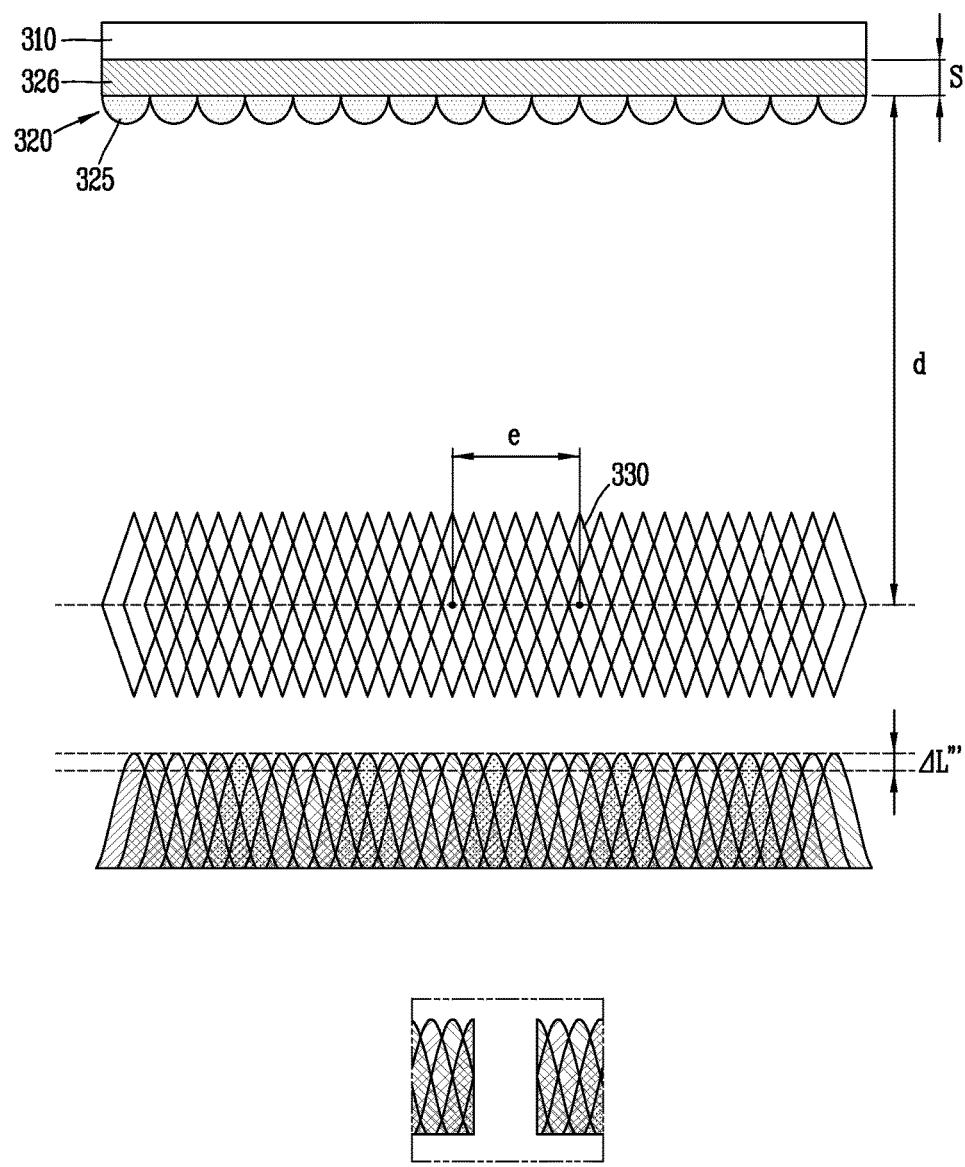
FIG. 11 is a view illustrating another view overlapping structure of an autostereoscopic 3D display device and a light profile, according to a third embodiment of the present disclosure, as an example.

Furthermore, FIGS. 10 and 11 are views illustrating a view overlapping structure of an autostereoscopic 3D display device and a light profile, according to the third embodiment of the present disclosure illustrated in FIG. 9, as an example.

Here, FIGS. 10 and 11 illustrate a two overlapping views structure and a three overlapping views structure, respectively, as an example.

As described above, viewing diamonds, light profiles, and view data forming a viewing zone are illustrated at the center of FIGS. 9, 10, and 11, and an actually perceived view is schematically illustrated at the bottom of FIGS. 9, 10, and 11. For reference, view data may be divided using hatching, and the same hatching denotes the same view data.

Referring to FIGS. 9, 10, and 11, an autostereoscopic 3D display device according to the third embodiment of the present disclosure may include an image panel 310 and a lenticular lens sheet 320 as a 3D filter located on a front surface of the image panel 310 to implement a stereoscopic image.

Here, the image panel 310 and lenticular lens sheet 320 are supported by a mechanical body (not shown), and the image panel 310 and lenticular lens sheet 320 may be separated by a predetermined distance (rear surface distance, S) by a gap glass 326.

The lenticular lens sheet 320 is formed with a plurality of lenticular lenses 325, an upper surface of which is made of a convex lens shaped material layer on a flat substrate, but the present disclosure is not be limited to this.

The 3D filter may also be formed in various ways using well-known technologies such as a barrier other than the lenticular lens sheet 320.

Here, according to the third embodiment of the present disclosure, the width of a viewing diamond 330 may be set to half the viewer's interocular distance (e), similar to the foregoing second embodiment of the present disclosure. However, the present disclosure is not limited to this, and the width of the viewing diamond 330 may be also set to a/n times (where a and n are natural numbers satisfying the condition: a <n) the interocular distance to be less than the interocular distance (e).

Through this, a mutual influence between the viewing diamonds 330 located at each of the viewer's eyes may be decreased to eliminate or reduce 3D crosstalk.

In order to reduce the width of the viewing diamond 330 at the same viewing distance (d) to be less than the interocular distance (e), according to the third embodiment of the present disclosure, a pitch of the lenticular lens 325 may be reduced compared to the related art. Here, the pitch of the lenticular lens 325 should be decreased to ½, ⅓, ¼, . . . , 1/n to reduce the width of the viewing diamond 330 to ½ e, ⅓ e, ¼ e, . . . , 1/n e.

At the same time, the third embodiment of the present disclosure may be configured to overlap two or three viewing diamonds 330 similarly to the foregoing second embodiment of the present disclosure. Through this, the luminance difference (ΔL", ΔL') due to a change in the viewer's location may be also reduced.

Here, the view data, namely, image, of the corresponding sub-pixel of the image panel 310, is formed in each viewing diamond 330.

Here, referring to a light profile measured at an optimal viewing distance (d) as described above, it is seen that the intensity of light is the highest at the center of the viewing diamond 330 and gradually reduces towards an end of the viewing diamond 330.

However, in the case of the third embodiment of the present disclosure, increasing an overlapping number of viewing diamonds 330 to two or three, as illustrated in FIGS. 10 and 11, greatly reduces the luminance difference ($\Delta L''$, $\Delta L'''$), but 3D crosstalk is relatively increased, similar to the foregoing second embodiment of the present disclosure.

Furthermore, the viewing angle (or horizontal viewing width) is reduced compared to the foregoing embodiment of the present disclosure as the width of the viewing diamond 330 is set to be less than the interocular distance (e), but part of the viewing diamond 330 formed between the viewer's left-eye and right-eye does not affect either of the viewer's eyes.

Accordingly, when a light source having the same characteristics is used, an interference between the viewing diamonds 330 is reduced, and thus the totally accumulated 3D crosstalk is relatively reduced compared to the foregoing embodiment of the present disclosure.

On the other hand, 3D crosstalk may not be completely eliminated or greatly reduced with only the foregoing configuration, and a method of newly mapping input data (or image data: hereinafter, input data and image data will be used in an interchangeable manner for the sake of convenience) for each sub-pixel of the image panel through a view data rendering process is proposed, and it will be described in detail with reference to the accompanying drawings.

Figure 12:
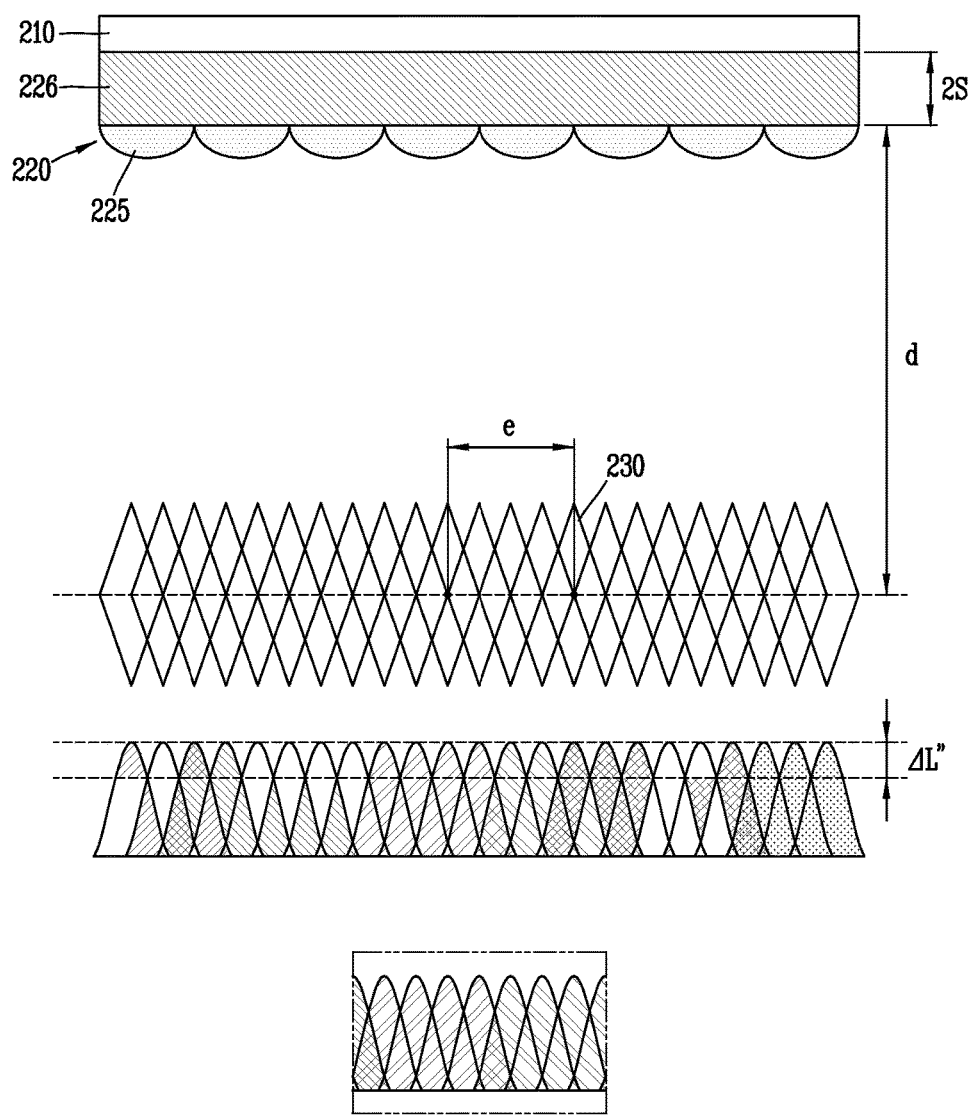
FIG. 12 is a view illustrating newly mapped light profiles and view data through view data rendering in a view overlapping structure of an autostereoscopic 3D display device, according to the second embodiment of the present disclosure illustrated in FIG. 7, as an example.

FIG. 12 is a view illustrating newly mapped light profiles and view data through view data rendering in a view overlapping structure of an autostereoscopic 3D display device, according to the second embodiment of the present disclosure illustrated in FIG. 7, as an example.

Figure 13:
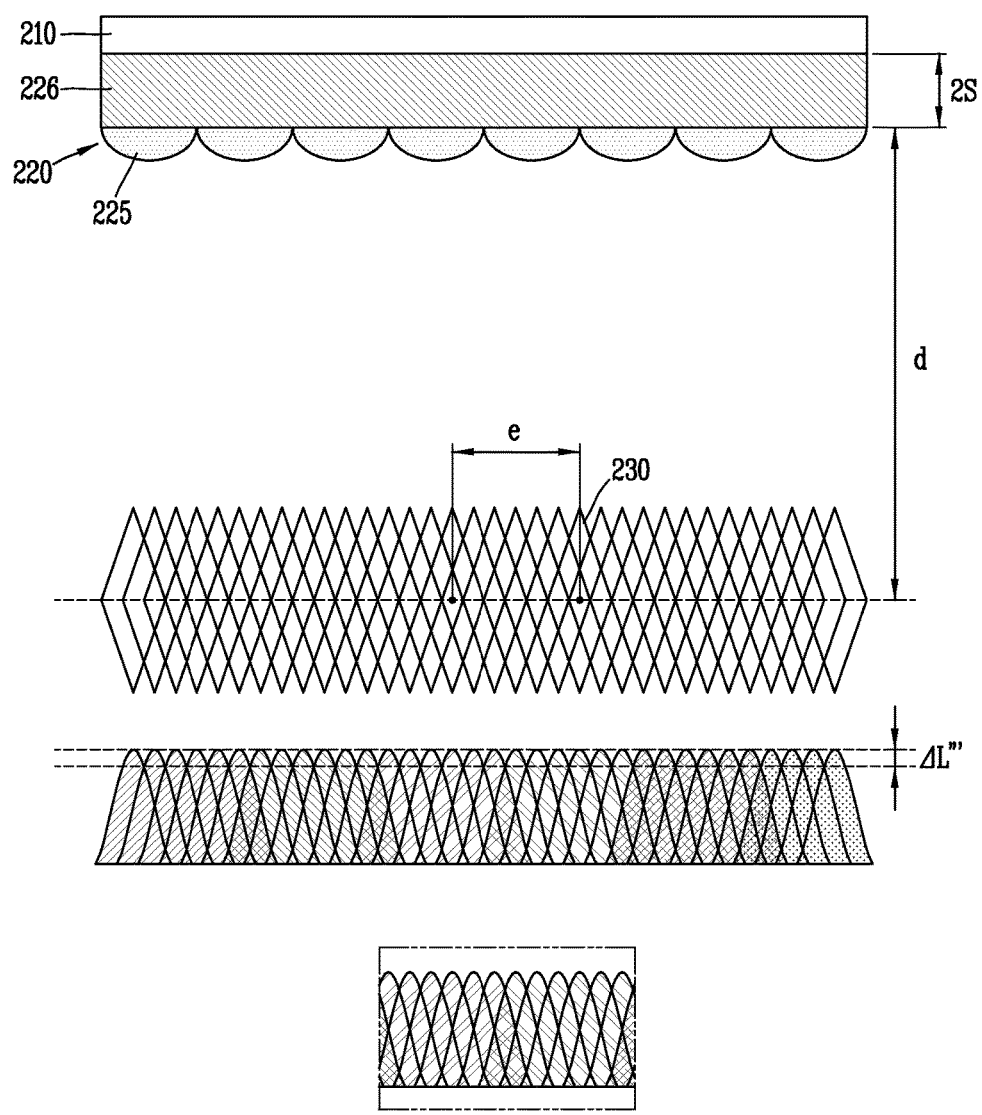
FIG. 13 is a view illustrating newly mapped light profiles and view data through view data rendering in another view overlapping structure of an autostereoscopic 3D display device, according to the second embodiment of the present disclosure illustrated in FIG. 8, as an example.

Furthermore, FIG. 13 is a view illustrating newly mapped light profiles and view data through view data rendering in another view overlapping structure of an autostereoscopic 3D display device, according to the second embodiment of the present disclosure illustrated in FIG. 8, as an example.

Here, only view data rendering for an autostereoscopic 3D display device according to the second embodiment of the present disclosure illustrated in FIGS. 7 and 8 will be described for the sake of convenience of explanation, but it may be applicable in a substantially similar manner to the third embodiment of the present disclosure illustrated in FIGS. 10 and 11.

Referring to FIGS. 12 and 13, it is seen that the configuration of an autostereoscopic 3D display device is the same as the foregoing configuration, but the light profile and view data are newly mapped through view data rendering.

In other words, FIGS. 12 and 13 illustrate light profiles, view data, and perceived views shown in a viewing zone after newly mapping input data for each sub-pixel of the image panel 210 through a view data rendering process.

View data rendering technology is basically a data processing technique for reducing the perceived 3D crosstalk due to an interference between adjoining viewing diamonds 230, and embodiments of the present disclosure newly map the same or similar input data between adjoining views in a state where the viewing diamonds 230 are overlapped with each other while at the same time reducing the width of the viewing diamond 230, thereby eliminating or reducing the perceived 3D crosstalk as well as extending the viewing angle.

Referring to a view perceived by the viewer, it is seen that the viewer's left-eye and right-eye look at images having a different color, namely, disparity, and the images are naturally changed according to the viewer's movement due to the same image (or medium view image that is created based on the views either side of it) being mapped to adjacent views.

As described above, view data is divided using hatching, wherein the same hatching denotes the same view data. In other words, the input data is grouped and processed such that the view images formed in corresponding adjacent viewing zones are substantially identical. For example, when the left-eye is located at a first view and the right-eye is located at a fifth view (in the case of a two overlapping views embodiment) or a seventh view (in case of a three overlapping views embodiment), view data that is the same as the first view is input to the views adjacent to the first view to the left and right, whereas view data the same as the fifth or seventh view is input to the views adjacent to the fifth view or seventh view on the left and right. Furthermore, view data the same as the first view, the fifth view or the seventh view, or view data with a medium view image, is entered between them. Thus, some of the input data groups can be transition groups to which a medium view image is mapped.

Furthermore, a viewing angle is also secured by a medium view image, contrary to FIGS. 7 and 8, prior to applying the view data rendering technology.

Hereinafter, a method of applying the foregoing view data rendering technology to input data (or image data) will be described in detail with reference to the accompanying drawings.

Figure 14:
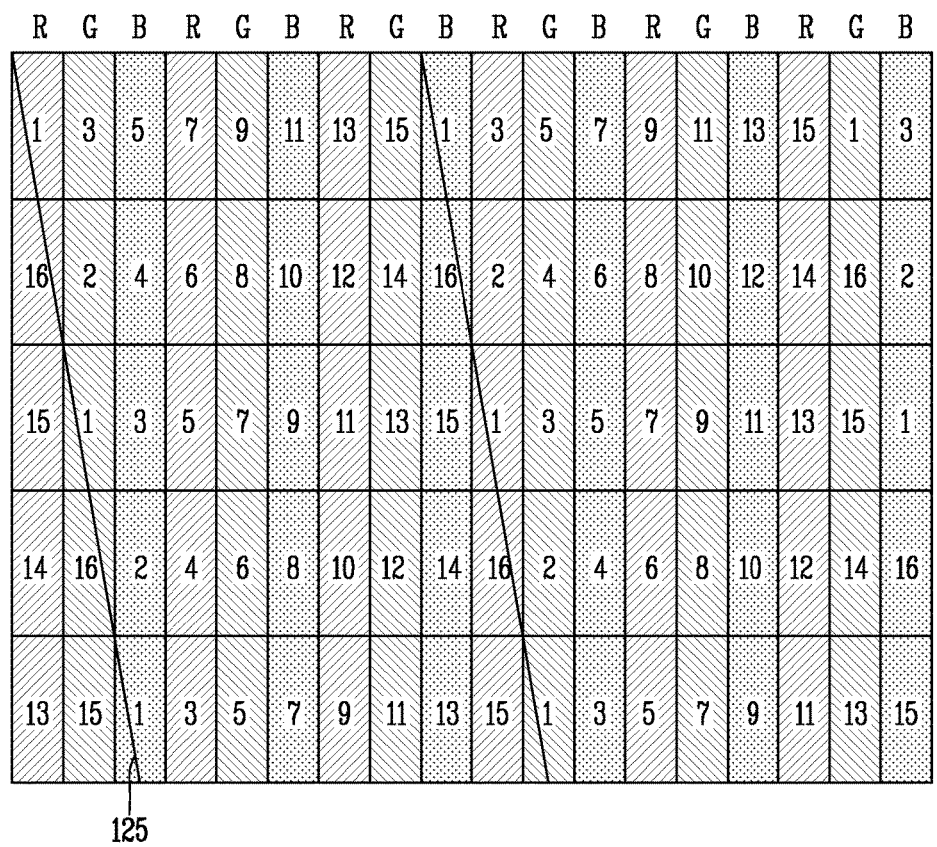
FIG. 14 is a view illustrating a pixel array written with a view map and a lenticular lens layout in an autostereoscopic 3D display device, according to the first embodiment of the present disclosure illustrated in FIG. 5, as an example.

FIG. 14 is a view illustrating a pixel array written with a view map and a lenticular lens layout in an autostereoscopic 3D display device, according to the first embodiment of the present disclosure illustrated in FIG. 5, as an example, in which a pixel array is shown in the case of using sixteen views as an example. However, the present disclosure is not limited to the foregoing number of views.

Here, R, G, and B indicated at the top of FIG. 14 indicate the location of R, G, and B sub-pixels.

Figure 15:
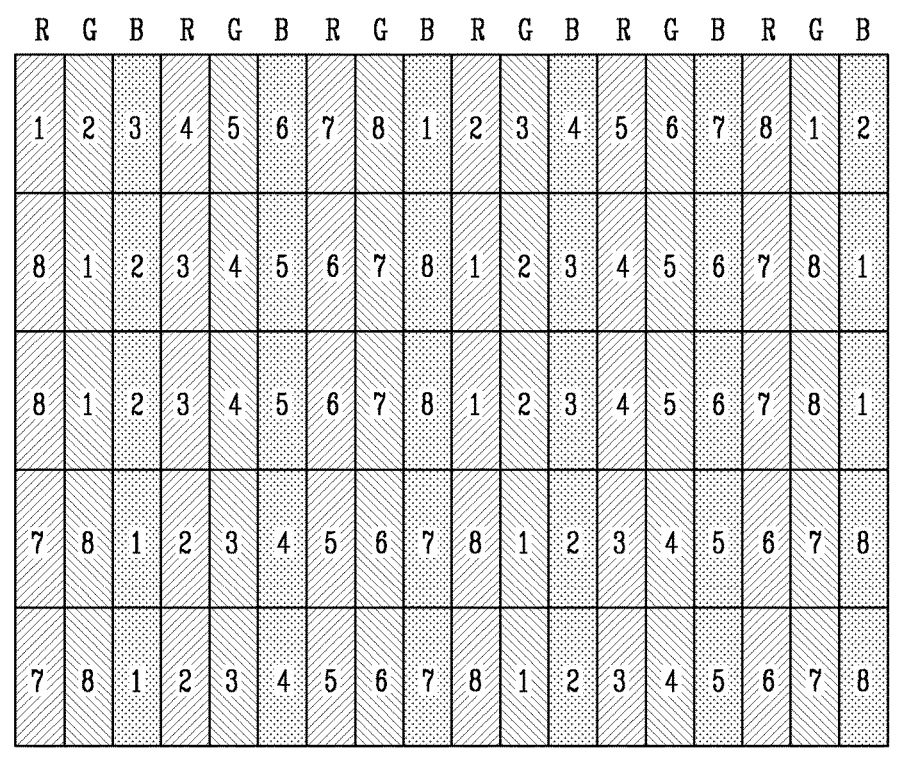

FIG. 15 is a view illustrating input data input to the pixel array illustrated in FIG. 14, according to the first embodiment of the present disclosure, as an example, in which newly mapped input data according to a view data rendering technology of the present disclosure is shown as an example.

Furthermore, FIG. 16 is a view illustrating an example of converting input data through view data rendering, according to one embodiment.

Here, numerical values 1, 2, 3, . . . , and 16 illustrated in FIGS. 15 and 16 indicate a first view image, a second view image, a third view image, . . . , and a sixteenth view image, respectively.

Referring to FIG. 14, when m (where m is a natural number) views are used, the image panel may allocate a first view through an m-th view to m sub-pixels in the unit of m sub-pixels.

In other words, a k-th view is allocated to a k-th sub-pixel (where k is a natural number satisfying the condition: 1≤k≤m) among m sub-pixels.

For an example, when 16 views are used, a first view (refer to FIG. 16) is allocated to a first sub-pixel, a second view is allocated to a second sub-pixel, a third view is allocated to a third sub-pixel, a fourth view is allocated to a fourth sub-pixel, a fifth view is allocated to a fifth sub-pixel, a sixth view is allocated to a sixth sub-pixel, a seventh view is allocated to a seventh sub-pixel, and an eighth view is allocated to an eighth sub-pixel. A ninth view is allocated to a ninth sub-pixel, a tenth view is allocated to a tenth sub-pixel, an eleventh view is allocated to an eleventh sub-pixel, and a twelfth view is allocated to a twelfth sub-pixel. A thirteenth view is allocated to a thirteenth sub-pixel, a fourteenth view is allocated to a fourteenth sub-pixel, a fifteenth view is allocated to a fifteenth sub-pixel, and a sixteenth view is allocated to a sixteenth sub-pixel.

To this end, the 3D filter may be implemented with a lenticular lens 125 having a slanted structure formed to be inclined at a predetermined angle with respect to the sub-pixels. More specifically, the lenticular lens 125 having a slanted structure is formed to be inclined by a predetermined angle with respect to a major axis side of the sub-pixels.

Accordingly, the 3D filter divides a first through an m-th view image (view images prior to being converted) displayed on m sub-pixels, into a first view through an m-th view, respectively. Accordingly, the 3D filter outputs a k-th view image displayed on a k-th sub-pixel as a k-th view.

For reference, a view map described in the present disclosure refers to coordinate information on a viewing zone in which a stereoscopic image output from a stereoscopic 3D display device according to one embodiment of the present disclosure is viewable, and the viewing zone may include a normal view zone, a reversed view zone, and a view disable zone.

Here, the normal view zone is a zone in which a viewer is able to view a stereoscopic image in a normal mode where a right-eye image is formed on the viewer's right-eye and a left-eye image is formed on the viewer's left-eye.

Furthermore, a reversed view zone is a zone in which the viewer quickly feels fatigue since a left-eye image is formed on the right-eye and a right-eye image is formed on the left-eye, though the viewer perceives an image in a stereoscopic manner.

In addition, the view disable zone refers to a zone in which the viewing of a stereoscopic image is disabled.

In other words, a view map may include coordinate information (i.e., a first view through an m-th view) on positions displayed with the foregoing three types of zones.

However, coordinate information on the view disable zone may be omitted on the view map since a zone excluding the normal view zone and reversed view zone is determined as a view disable zone.

Referring to FIGS. 15 and 16, when a view data rendering technology according to one embodiment of the present disclosure is applied, input data may be newly mapped to the same input data between adjoining views.

Figure 2:
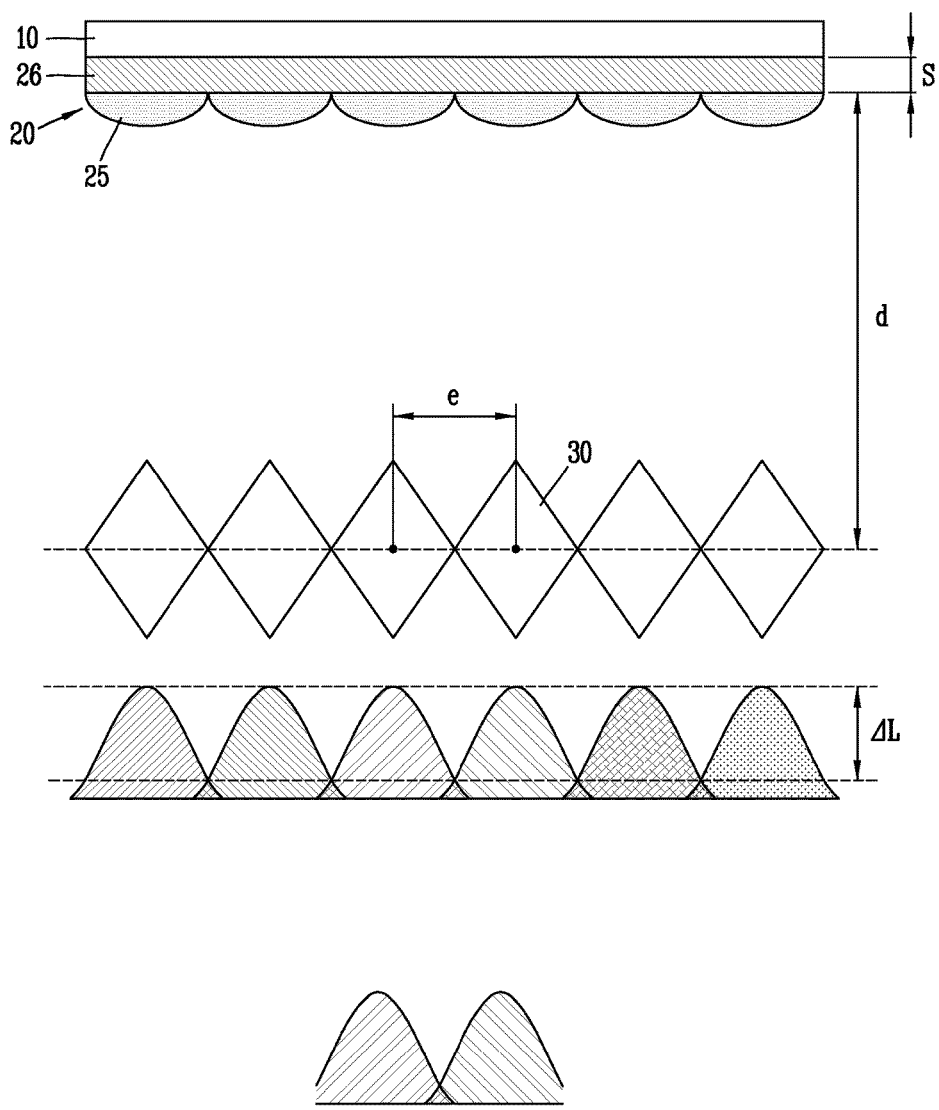
FIG. 2 is a view illustrating a typical lenticular lens type stereoscopic 3D display device and a light profile as an example.

For an example, when sixteen views are used, the input data of a second view (refer to FIG. 2) is converted from a second view image to a first view image. Furthermore, the input data of a third view is converted from a third view image to a second view image, and the input data of a fourth view is converted from a fourth view image to a second view image. The input data of a fifth view is converted from a fifth view image to a third view image, and the input data of a sixth view is converted from a sixth view image to a third view image. The input data of a seventh view is converted from a seventh view image to a fourth view image, and the input data of an eighth view is converted from an eighth view image to a fourth view image. The input data of a ninth view is converted from a ninth view image to a fifth view image, and the input data of a tenth view is converted from a tenth view image to a fifth view image. The input data of an eleventh view is converted from an eleventh view image to a sixth view image, and the input data of a twelfth view is converted from a twelfth view image to a sixth view image. The input data of a thirteenth view is converted from a thirteenth view image to a seventh view image, and the input data of a fourteenth view is converted from a fourteenth view image to a seventh view image. The input data of a fifteenth view is converted from a fifteenth view image to an eighth view image, and the input data of a sixteenth view is converted from a sixteenth view image to an eighth view image.

When sixteen views are used as described above, a first view image through a sixteenth view image may be input due to a two overlapping structure of the viewing diamonds, but the input data may be processed to output only a first view through an eighth view image, thus reducing a difference between images perceived within a single eye so as to reduce 3D crosstalk.

Figure 17A:
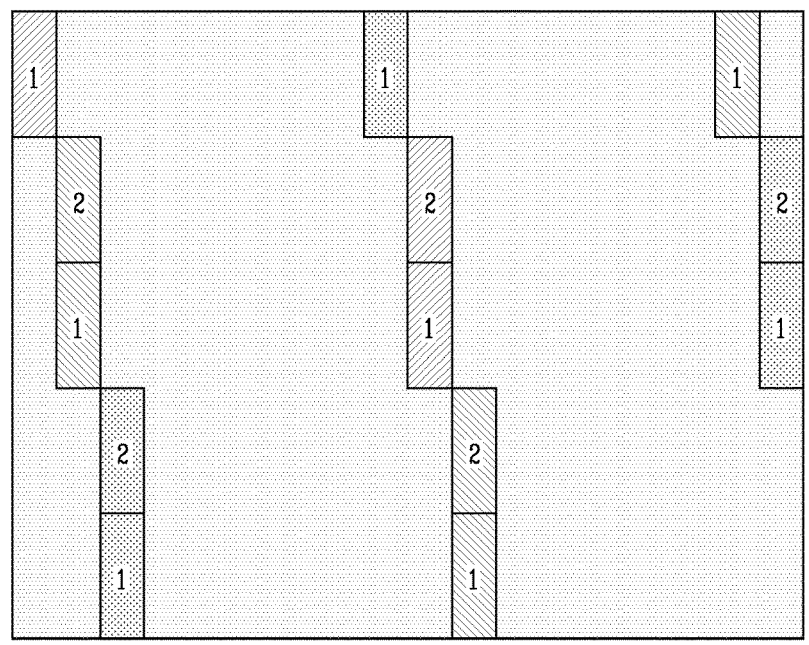
FIGS. 17A and 17B are views illustrating sub-pixels and views perceived by the left-eye and right-eye in an autostereoscopic 3D display device, according to the first embodiment of the present disclosure illustrated in FIG. 5, as an example.
Figure 17B:
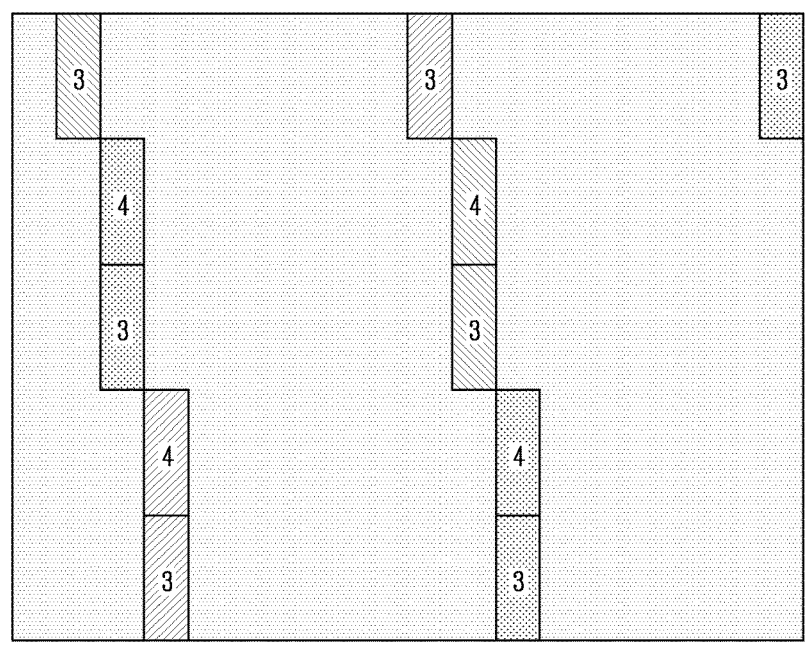

FIGS. 17A and 17B are views illustrating sub-pixels and views perceived by the left-eye and right-eye in an autostereoscopic 3D display device, according to the first embodiment of the present disclosure illustrated in FIG. 5, as an example.

Figure 18A:
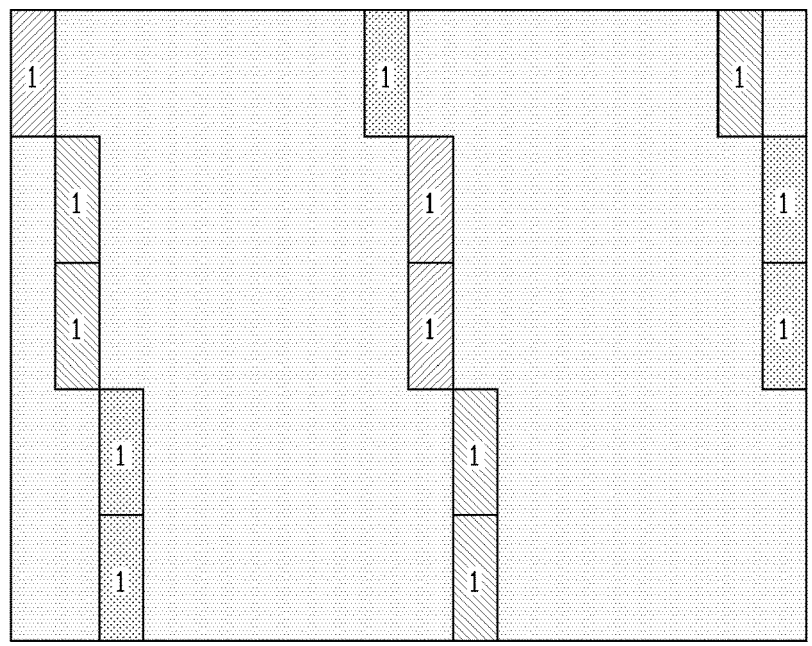
FIGS. 18A and 18B are views illustrating input data perceived by the left-eye and right-eye in an autostereoscopic 3D display device, according to the first embodiment of the present disclosure illustrated in FIG. 5, as an example.
Figure 18B:
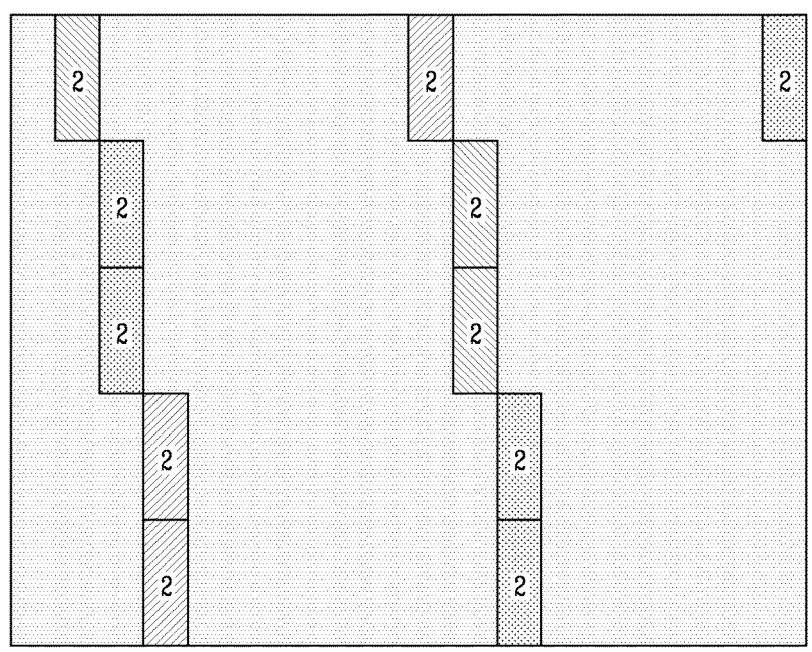

Furthermore, FIGS. 18A and 18B are views illustrating input data perceived by the left-eye and right-eye in an autostereoscopic 3D display device, according to the first embodiment of the present disclosure illustrated in FIG. 5, as an example.

Here, FIGS. 17A and 18A illustrate sub-pixels, views, and input data perceived from the left-eye, as an example, and FIGS. 17B and 18B illustrate sub-pixels, views, and input data perceived from the right-eye, as an example.

Figure 19A:
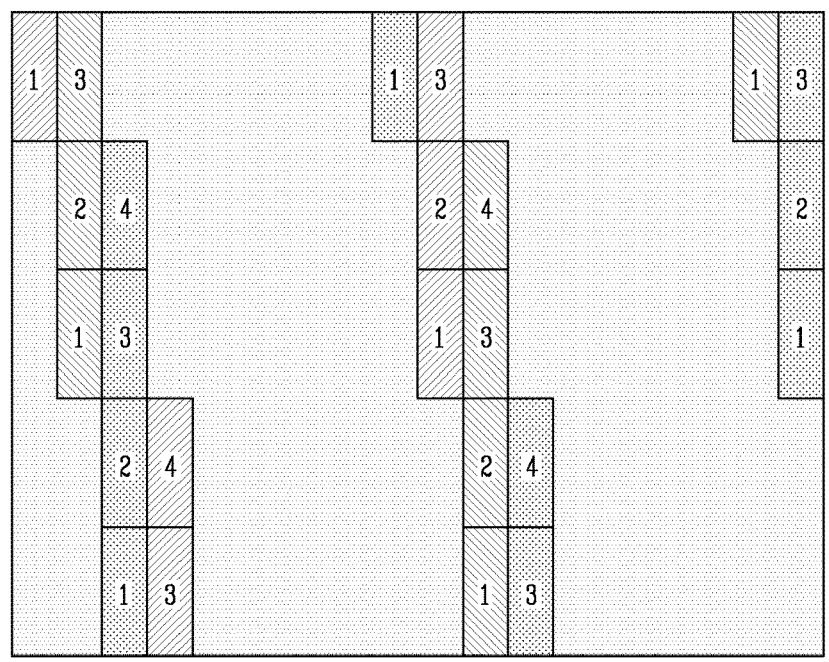
FIGS. 19A and 19B are views illustrating sub-pixels and input data perceived by both eyes in an autostereoscopic 3D display device, according to the first embodiment of the present disclosure illustrated in FIG. 5, as an example.
Figure 19B:
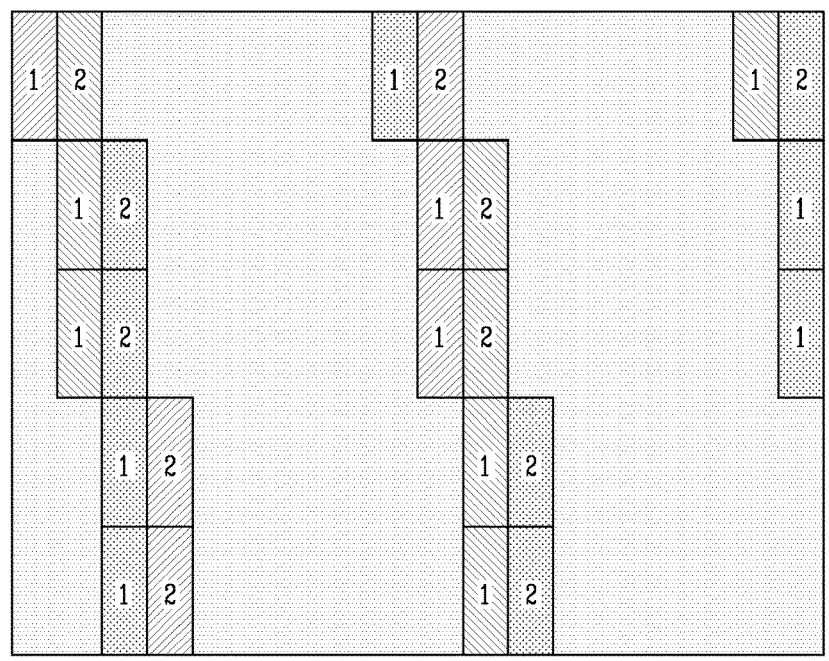

FIGS. 19A and 19B are views illustrating sub-pixels and input data perceived by both eyes in an autostereoscopic 3D display device, according to the first embodiment of the present disclosure illustrated in FIG. 5, as an example.

In an ideal case where there is no 3D crosstalk between adjoining views, the number of views perceived by a viewer from two overlapping viewing diamonds is two, based on a single eye. Accordingly, sub-pixels perceived by the left-eye and right-eye may be expressed as illustrated in FIGS. 17A and 17B.

Here, in an autostereoscopic 3D display device, according to a first embodiment of the present disclosure illustrated in FIG. 5, the width of a viewing diamond is based on the interocular distance, and thus when the left-eye perceives a first view, the right-eye perceives a second view if there are no overlapping viewing diamonds.

Accordingly, as one more viewing diamond exist between the left-eye and right-eye in the case of two overlapping views, when the left-eye perceives a first view, the right-eye perceives a third view as illustrated in FIGS. 17A and 17B (refer to FIG. 19A for the case of both eyes).

In this case, it is seen that a sub-pixel perceived from the left-eye is adjacent to a sub-pixel perceived from the right-eye.

Here, when a view data rendering technology according to one embodiment of the present disclosure is applied, in the case of two overlapping views, when the left-eye views a first view image, the right-eye views a second view image, as illustrated in FIGS. 18A and 18B (refer to FIG. 19B for the case of both eyes).

The view data rendering technology may be applicable to the second and third embodiments of the present disclosure as follows. Here, in an autostereoscopic 3D display device according to the third embodiment of the present disclosure, light profiles and view data are substantially the same as in the second embodiment of the present disclosure, as described above, and thus only the second embodiment of the present disclosure will be described for the sake of convenience.

First, a case where a view data rendering technology is applied to a two overlapping views structure of viewing diamonds will be described, and a case of using sixteen views will be described below, but the present disclosure is not limited to the number of views described above.

Figure 20:
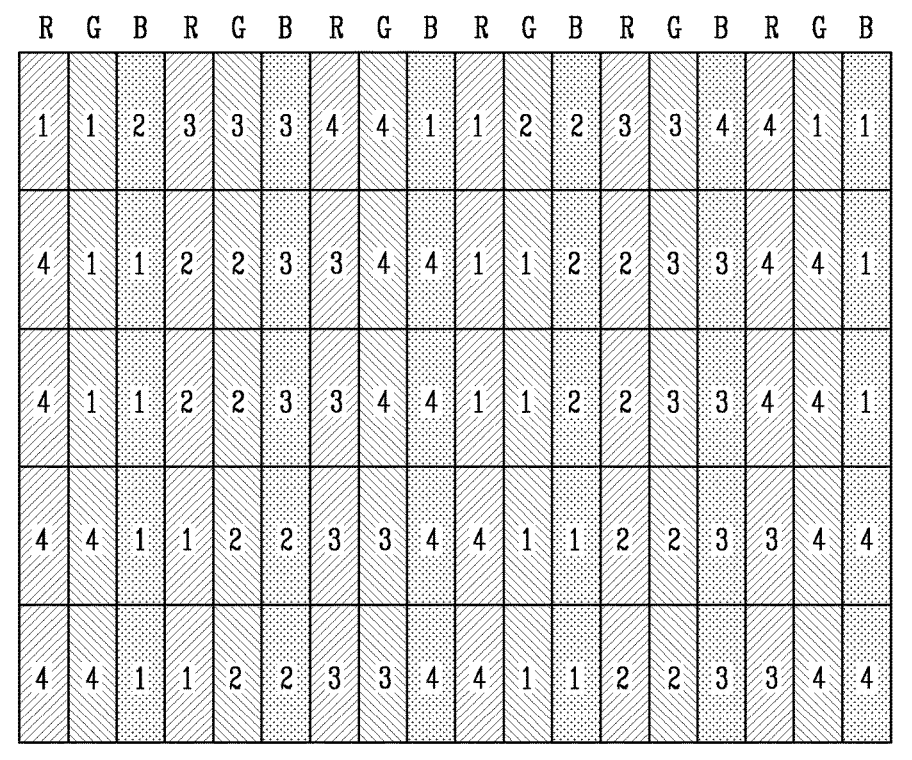

FIG. 20 is a view illustrating input data input to a pixel array in an autostereoscopic 3D display device, according to the second embodiment of the present disclosure illustrated in FIG. 7, as an example, in which input data newly mapped according to a view data rendering technology of one embodiment of the present disclosure is shown as an example.

FIG. 21 is a view illustrating an example of converting input data through view data rendering, according to one embodiment.

Figure 22:
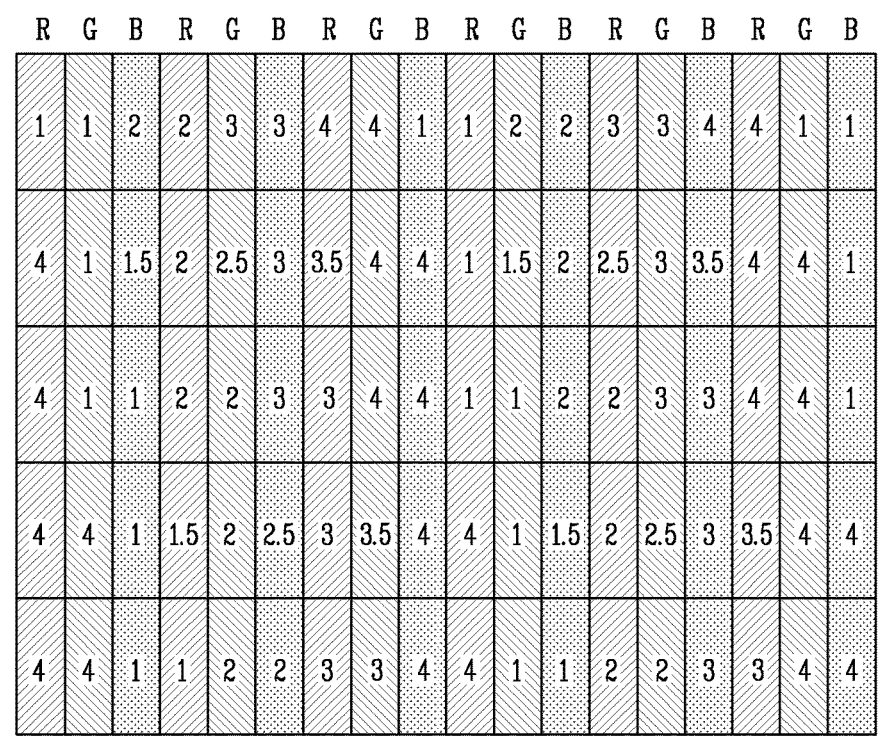

Furthermore, FIG. 22 is a view illustrating input data input to a pixel array in an autostereoscopic 3D display device, according to the second embodiment of the present disclosure illustrated in FIG. 7, as another example. Here, FIG. 22 illustrates mapped input data to insert a medium view image between view images, in contrast to FIG. 20.

FIG. 23 is a view illustrating another example of converting input data through view data rendering.

Here, numerical values 1, 2, 3, . . . , and 16 illustrated in FIGS. 20 through 23 indicate a first view image, a second view image, a third view image, . . . , and a sixteenth view image, respectively. Furthermore, numerical values 1.5, 2.5, and 3.5 illustrated in FIGS. 22 and 23 indicate a medium view image between a first view image and a second view image, a medium view image between a second view image and a third view image, and a medium view image between a third view image and a fourth view image, respectively.

As described above, a k-th view is allocated to a k-th sub-pixel (where k is a natural number satisfying the condition: 1≤k≤m) among m sub-pixels.

Furthermore, the 3D filter divides a first through an m-th view image (view images prior to conversion) displayed on m sub-pixels into a first view through an m-th view, respectively. Accordingly, the 3D filter outputs a k-th view image displayed on a k-th sub-pixel as a k-th view.

Referring to FIGS. 20, 21, 22, and 23, when a view data rendering technology according to one embodiment of the present disclosure is applied, input data may be newly mapped to the same or similar (in the case of FIGS. 22 and 23) input data between adjoining views.

When sixteen views are used as an example, in the case of FIGS. 20 and 21, the input data of a second view (refer to FIG. 21), a third view, and a fourth view is converted into a first converted view image used as a second view image, a third view image, and a fourth view image. Furthermore, the input data of a fifth view, a sixth view, a seventh view, and an eighth view is converted into a second converted view image used as a fifth view image, a sixth view image, a seventh view image, and an eighth view image. The input data of a ninth view, a tenth view, an eleventh view, and a twelfth view is converted into a third converted view image used as a ninth view image, a tenth view image, an eleventh view image, and a twelfth view image. The input data of a thirteenth view, a fourteenth view, a fifteenth view, and a sixteenth view is converted into a fourth converted view image used as a thirteenth view image, a fourteenth view image, a fifteenth view image, and a sixteenth view image.

In addition, in the case of FIGS. 22 and 23, the input data of a second view (refer to FIG. 23) and a third view is converted into a first converted view image used as a second view image and a third view image, whereas the input data of a fourth view is converted into a 1.5-th converted view image, which is a medium view image between the first converted view image and the second converted view image, used as a fourth view image. Furthermore, the input data of a fifth view, a sixth view, and a seventh view is converted into a second converted view image used as a fifth view image, a sixth view image, and a seventh view image, whereas the input data of an eighth view is converted into a 2.5-th converted view image, which is a medium view image between the second converted view image and the third converted view image, used as an eighth view image. The input data of a ninth view, a tenth view, and an eleventh view is converted into a third converted view image used as a ninth view image, a tenth view image, and an eleventh view image, whereas the input data of a twelfth view is converted into a 3.5-th converted view image, which is a medium view image between the third converted view image and the fourth converted view image, used as a twelfth view image. When a medium view image is inserted between view images as described above, it has an advantage in which an image is naturally changed according to the viewer's movement in a more effective manner.

However, the input data of a thirteenth view, a fourteenth view, a fifteenth view, and a sixteenth view is converted into a fourth converted view image used as a thirteenth view image, a fourteenth view image, a fifteenth view image, and a sixteenth view image. In other words, since there is no fifth converted view image in this case, the input data of the sixteenth view is converted into the fourth converted view image, which is the last view image, without being converted into a medium view image between the fourth converted view image and the non-existent fifth converted view image.

When sixteen views are used as described above, a first view image through a sixteenth view image may be input due to viewing diamonds with a two overlapping views structure, but only a first converted view image through a fourth converted view image may be output by overlapping four input data with each other to reduce a difference between images perceived within a single eye so as to reduce perceived 3D crosstalk.

According to the structure of the related art, an overlapping number of viewing diamonds is the same as the number of input data according, but in embodiments of the present disclosure, an overlapping number of input data has the following equation.

Overlapping number of input data≤overlapping number of viewing diamonds ($D$) ×(interocular distance/width of $D$)

When the overlapping number of input data is less than the overlapping number of viewing diamonds ($D$)×(interocular distance/width of $D$), medium view data may be entered between view images to add a portion in which the view image is changed by half views, rather than one whole view, according to a viewer's horizontal movement, thereby inducing a more natural image change. The number of medium image views may be controlled.

Figure 24A:
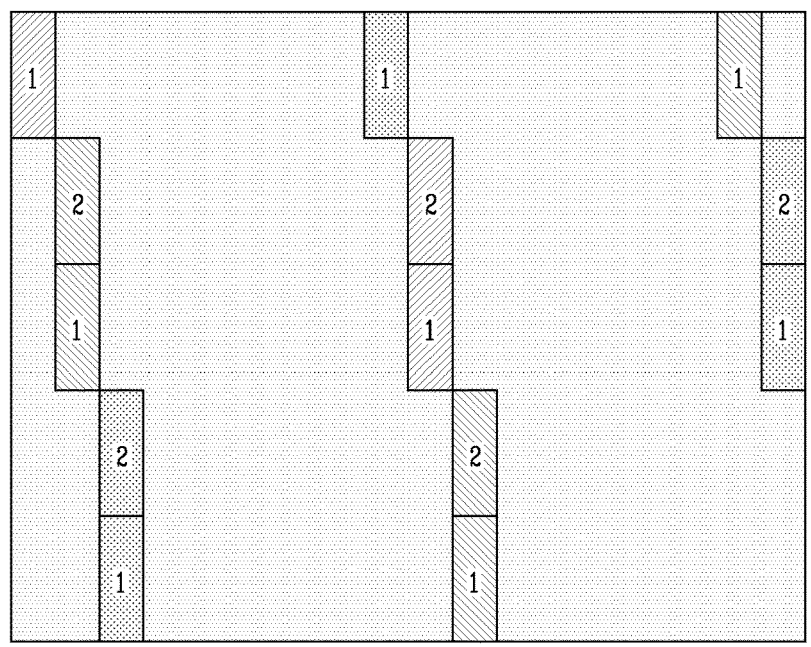
FIGS. 24A and 24B are views illustrating sub-pixels and views perceived by the left-eye and right-eye in an autostereoscopic 3D display device, according to the second embodiment of the present disclosure illustrated in FIG. 7, as an example.
Figure 24B:
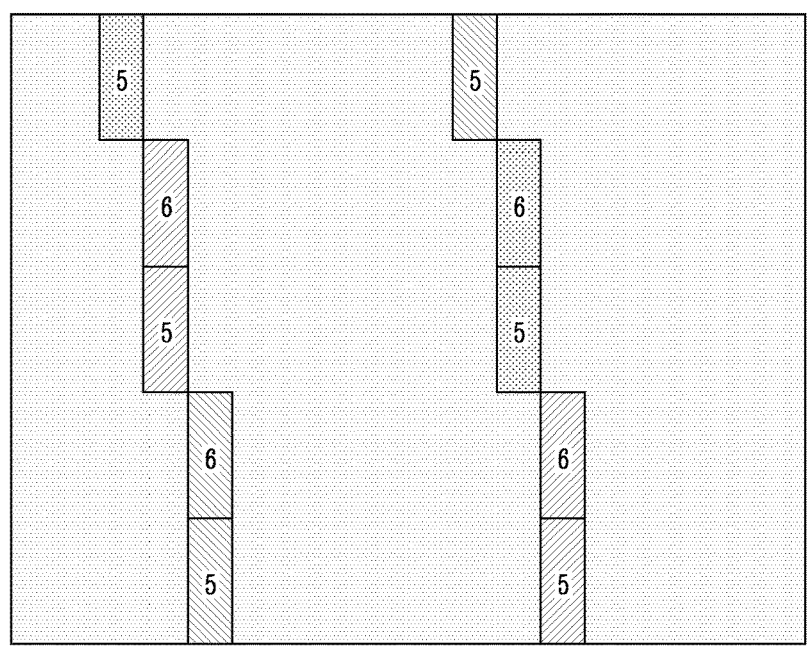

FIGS. 24A and 24B are views illustrating sub-pixels and views perceived by the left-eye and right-eye in an autostereoscopic 3D display device, according to the second embodiment of the present disclosure illustrated in FIG. 7, as an example.

Figure 25A:
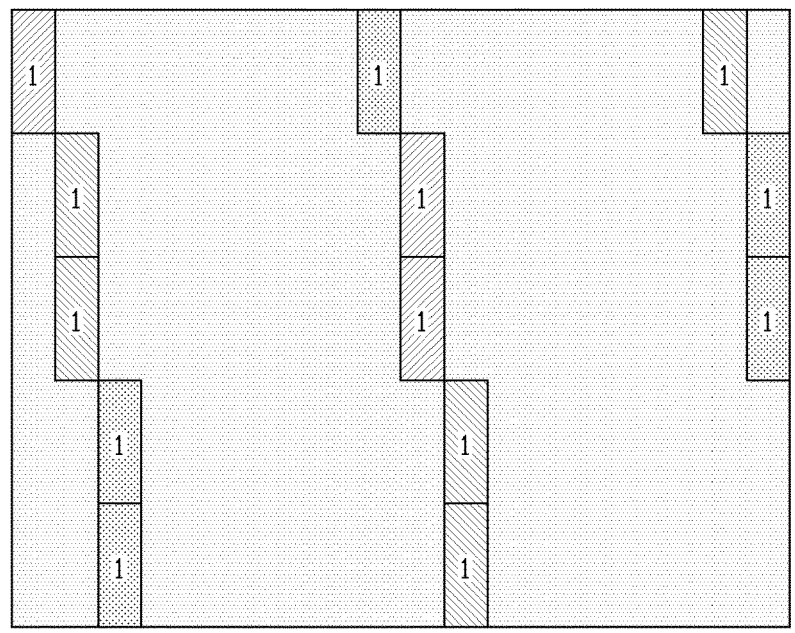
FIGS. 25A and 25B are views illustrating input data perceived by the left-eye and right-eye in an autostereoscopic 3D display device, according to the second embodiment of the present disclosure illustrated in FIG. 7, as an example.
Figure 25B:
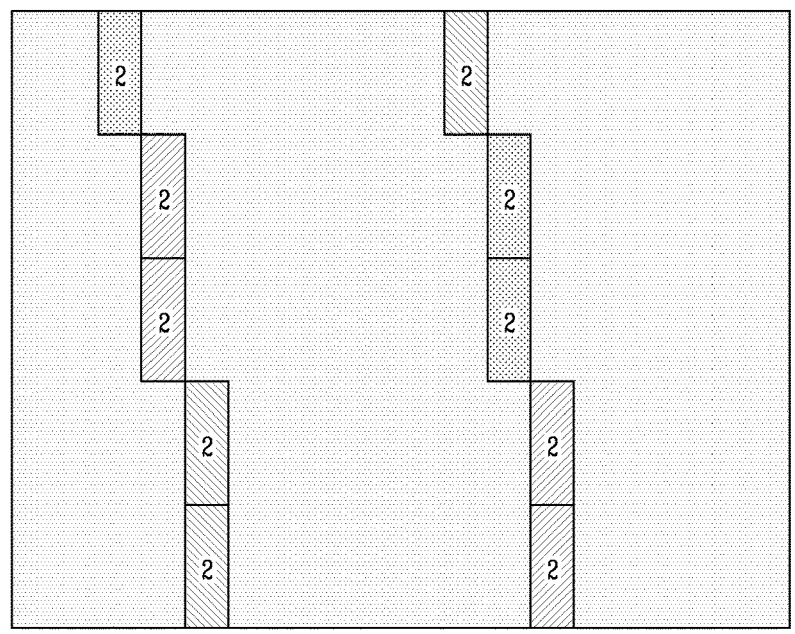

Furthermore, FIGS. 25A and 25B are views illustrating input data perceived by the left-eye and right-eye in an autostereoscopic 3D display device, according to the second embodiment of the present disclosure illustrated in FIG. 7, as an example.

Here, FIGS. 24A and 25A illustrate sub-pixels, views and input data perceived from the left-eye, as an example, and FIGS. 24B and 25B illustrate sub-pixels, views and input data perceived from the right-eye, as an example.

Figure 26A:
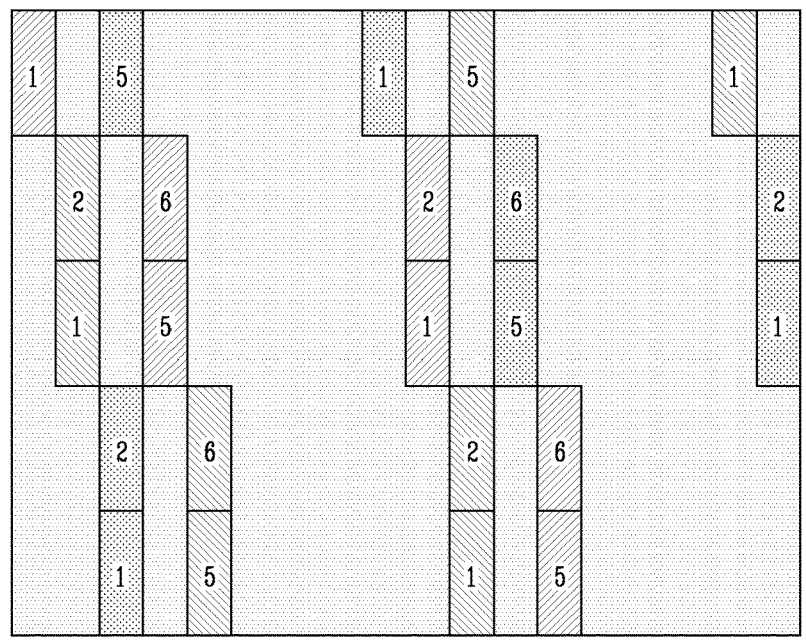
FIGS. 26A and 26B are views illustrating sub-pixels and input data perceived by both eyes in an autostereoscopic 3D display device, according to the second embodiment of the present disclosure illustrated in FIG. 7, as an example.
Figure 26B:
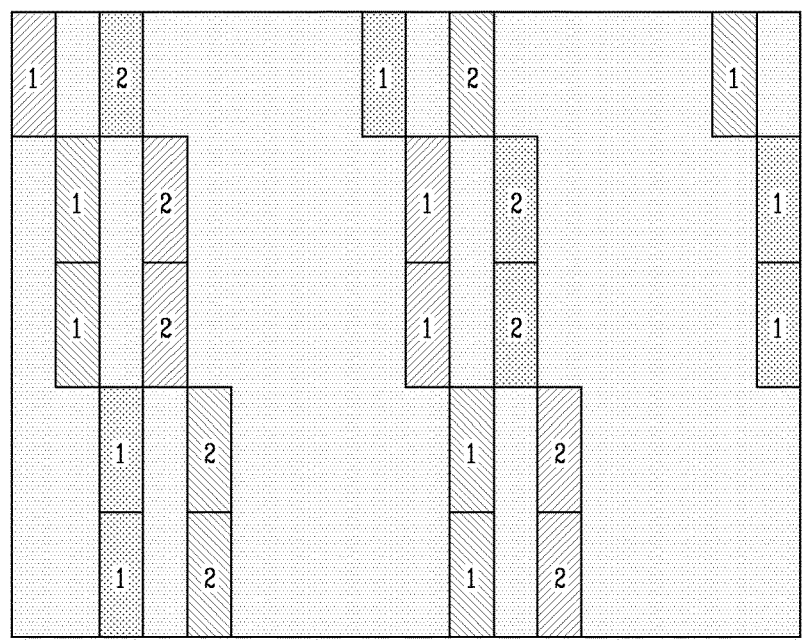

FIGS. 26A and 26B are views illustrating sub-pixels and input data perceived by both eyes in an autostereoscopic 3D display device, according to the second embodiment of the present disclosure illustrated in FIG. 7, as an example.

Referring to FIGS. 24A and 24B, an autostereoscopic 3D display device, according to the second embodiment of the present disclosure illustrated in FIG. 7, has a two overlapping views structure while the width of a viewing diamond is half of the interocular distance, thereby resulting in a single eye perceiving two views at the same time.

However, due to having a two overlapping views structure while at the same time reducing the width of a viewing diamond to half of the interocular distance, three viewing diamonds further exist between the left-eye and right-eye (refer to FIG. 12), and, for an example, when the left-eye perceives a first view, the right-eye perceives a fifth view spaced apart by the interocular distance (refer to FIG. 26A in the case of the interocular distance).

Here, when a view data rendering technology according to one embodiment of the present disclosure is applied, in the case of two overlapping views, as illustrated in FIGS. 25A and 25B, when the left-eye views a first view image, the right-eye views a second view image, spaced apart by the interocular distance (refer to FIG. 26B in the case of the interocular distance).

In this case, contrary to the foregoing first embodiment of the present disclosure, it is seen that a sub-pixel perceived from the left-eye and a sub-pixel perceived from the right-eye are spatially separated by one sub-pixel. In other words, a view map according to the second embodiment (and the third embodiment) of the present disclosure may be less affected by light interference generated between sub-pixels matching to the left-eye and right-eye when compared to a structure in the related art, thereby eliminating or reducing 3D crosstalk.

Accordingly, a number of viewing diamonds located between the interocular distance increases as the viewing diamond is set to be less than the interocular distance, and as a result, a distance between sub-pixels perceived by the left-eye and right-eye physically increases, thereby reducing 3D crosstalk. Furthermore, as a result, a blurred portion of the perceived image may be eliminated, thereby enhancing 3D depth perceived by the viewer.

Consequently, according to one embodiment of the present disclosure, 3D crosstalk perceived by the viewer in a viewing zone may be additionally reduced while at the same time securing viewing angle, and an image flipping phenomenon produced by a difference between images may be greatly reduced when the viewer moves from a reversed view zone to a normal view zone or from a normal view zone again to a reversed view zone. In other words, the number of view images entered as a whole may be reduced when compared to the related art, thereby reducing an image flipping phenomenon.

On the other hand, the view data rendering technology may be applicable regardless of the number of overlapping views, and a case where the width of a viewing diamond is half of the interocular distance while having a three overlapping views structure will be described in detail with reference to the accompanying drawings, as another example.

In other words, a case where a view data rendering technology is applied to a three overlapping views structure of viewing diamonds will be described, and a case of using eighteen views will be described below, but the present disclosure is not limited to the number of views as described above.

Figure 27:
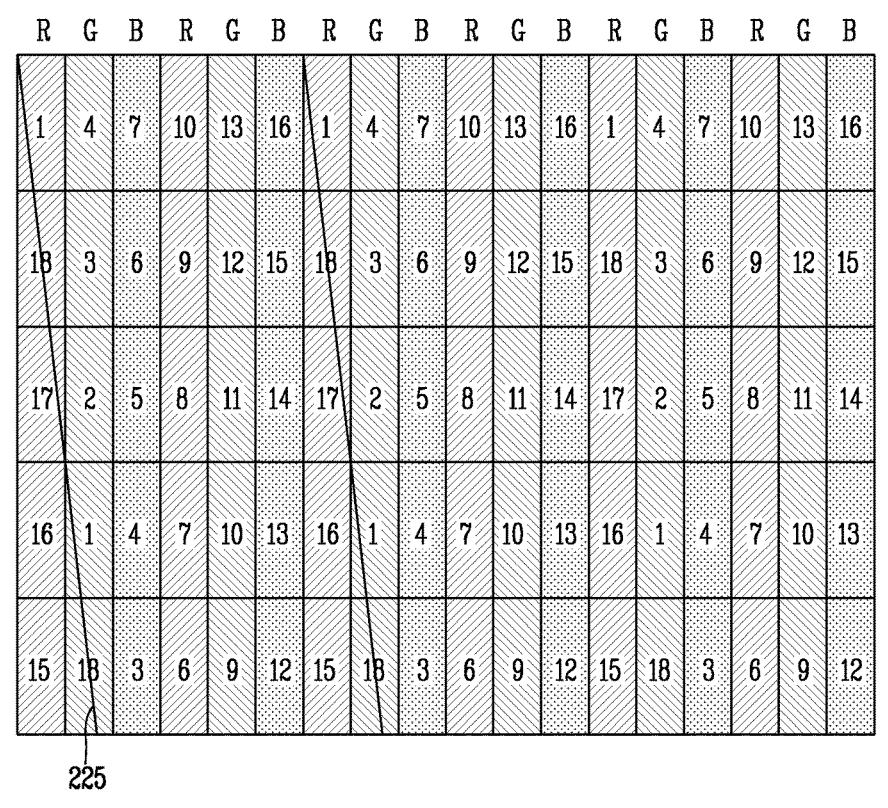

FIG. 27 is a view illustrating a pixel array written with a view map and a lenticular lens layout in an autostereoscopic 3D display device, according to the second embodiment of the present disclosure illustrated in FIG. 8, as an example, in which a pixel array in the case of using eighteen views is shown as an example. However, the present disclosure is not limited to the foregoing number of views.

Here, as described above, in an autostereoscopic 3D display device, according to the third embodiment of the present disclosure, light profiles and view data are substantially the same as the second embodiment of the present disclosure, and thus only the second embodiment of the present disclosure will be described for the sake of convenience.

R, G, and B, indicated at the top of FIG. 27, indicate the location of R, G, and B sub-pixels.

FIG. 28 is a view illustrating input data input to the pixel array illustrated in FIG. 27 as an example, in which newly mapped input data according to a view data rendering technology of one embodiment of the present disclosure is shown as an example.

FIG. 29 is a view illustrating an example of converting input data through view data rendering.

Furthermore, FIG. 30 is a view illustrating input data input to a pixel array in an autostereoscopic 3D display device, according to the second embodiment of the present disclosure illustrated in FIG. 8, as another example. Here, FIG. 30 illustrates input data mapped to insert a medium view image between view images, in contrast to FIG. 28.

FIG. 31 is a view illustrating another example of converting input data through view data rendering.

Here, numerical values 1, 2, 3, . . . , and 18, illustrated in FIGS. 27 through 31, indicate a first view image, a second view image, a third view image, . . . , and an eighteenth view image, respectively. Furthermore, numerical values 1.5 and 2.5 illustrated in FIGS. 30 and 31 indicate a medium view image between a first view image and a second view image and a medium view image between a second view image and a third view image, respectively.

Referring to FIG. 27, when m (where m is a natural number) views are used, the image panel may allocate a first view through an m-th view to m sub-pixels in the unit of m sub-pixels.

In other words, as described above, a k-th view is allocated to a k-th sub-pixel (where k is a natural number satisfying the condition: 1≤k≤m) among m sub-pixels.

For an example, when eighteen views are used, a first view is allocated to a first sub-pixel, a second view is allocated to a second sub-pixel, a third view is allocated to a third sub-pixel, and a fourth view is allocated to a fourth sub-pixel. Furthermore, a fifth view is allocated to a fifth sub-pixel, a sixth view is allocated to a sixth sub-pixel, a seventh view is allocated to a seventh sub-pixel, and an eighth view is allocated to an eighth sub-pixel. A ninth view is allocated to a ninth sub-pixel, a tenth view is allocated to a tenth sub-pixel, an eleventh view is allocated to an eleventh sub-pixel, and a twelfth view is allocated to a twelfth sub-pixel. A thirteenth view is allocated to a thirteenth sub-pixel, a fourteenth view is allocated to a fourteenth sub-pixel, a fifteenth view is allocated to a fifteenth sub-pixel, and a sixteenth view is allocated to a sixteenth sub-pixel. Furthermore, a seventeenth view is allocated to a seventeenth sub-pixel, and an eighteenth view is allocated to an eighteenth sub-pixel.

To this end, the 3D filter may be implemented with a lenticular lens 225 having a slanted structure formed to be inclined at a predetermined angle with respect to the sub-pixels. More specifically, the lenticular lens 225 having a slanted structure is formed to be inclined by a predetermined angle with respect to a major axis side of the sub-pixels.

Accordingly, the 3D filter divides a first through an m-th view image (view images prior to being converted) displayed on m sub-pixels into a first view through an m-th view, respectively. Accordingly, the 3D filter outputs a k-th view image displayed on a k-th sub-pixel as a k-th view.

Referring to FIGS. 28, 29, 30, and 31, when a view data rendering technology according to one embodiment of the present disclosure is applied, input data may be newly mapped to the same or similar (in case of FIGS. 30 and 31) input data between adjoining views.

When eighteen views are used, as an example, in the case of FIGS. 28 and 29, the input data of a second view (refer to FIG. 20), a third view, a fourth view, a fifth view, and a sixth view is converted into a first converted view image used as a second view image, a third view image, a fourth view image, a fifth view image, and a sixth view image. Furthermore, the input data of a seventh view, an eighth view, a ninth view, a tenth view, an eleventh view, and a twelfth view is converted into a second converted view image used as a seventh view image, an eighth view image, a ninth view image, a tenth view image, an eleventh view image, and a twelfth view image. The input data of thirteenth view, a fourteenth view, a fifteenth view, a sixteenth view, a seventeenth view, and an eighteenth view is converted into a fourth converted view image used as a thirteenth view image, a fourteenth view image, a fifteenth view image, a sixteenth view image, a seventeenth view image, and an eighteenth view image.

In addition, in the case of FIGS. 30 and 31, the input data of a second view (refer to FIG. 31), a third view, and a fourth view is converted into a first converted view image used as a second view image, a third view image, and a fourth view image, whereas the input data of a fifth view and a sixth view is converted into a 1.5-th converted view image, which is a medium view image between the first view image and the second view image and used as a fifth view image and a sixth view image. Furthermore, the input data of a seventh view, an eighth view, a ninth view, and a tenth view is converted into a second converted view image used as a seventh view image, an eighth view image, a ninth view image, and a tenth view image, whereas the input data of an eleventh view and a twelfth view is converted into a 2.5-th converted view image, which is a medium view image used as an eleventh view image and a twelfth view image. When a medium view image is inserted between view images as described above, it has an advantage in which an image is naturally changed according to the viewer's movement in a more effective manner.

However, the input data of a thirteenth view, a fourteenth view, a fifteenth view, a sixteenth view, a seventeenth view, and an eighteenth view is converted into a third converted view image used as a thirteenth view image, a fourteenth view image, a fifteenth view image, a sixteenth view image, a seventeenth view image, and an eighteenth view image, respectively. In other words, since there is no converted fourth view image in this case, the input data of the seventeenth view and eighteenth view is converted into a third converted view image, which is the last converted view image, without being converted into a medium view image between the third converted image and the non-existent fourth converted view image.

When eighteen views are used as described above, a first view image through a seventeenth view image may be input due to viewing diamonds with a three overlapping views structure, but only a first view through a third view image may be output by overlapping six input data with each other to reduce a difference between images perceived within a single eye so as to reduce perceived 3D crosstalk.

Figure 32A:
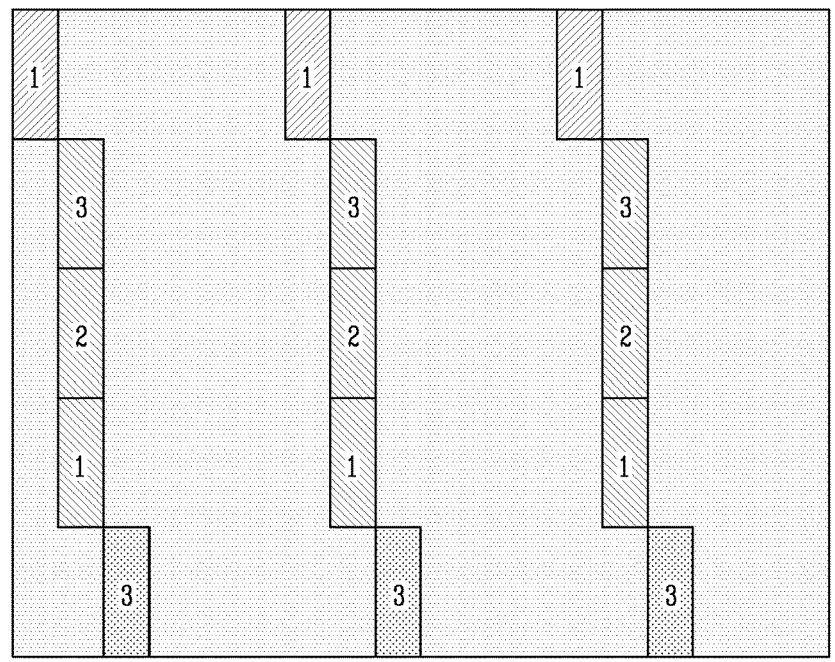
FIGS. 32A and 32B are views illustrating sub-pixels and views perceived by the left-eye and right-eye in an autostereoscopic 3D display device, according to the second embodiment of the present disclosure illustrated in FIG. 8, as an example.
Figure 32B:
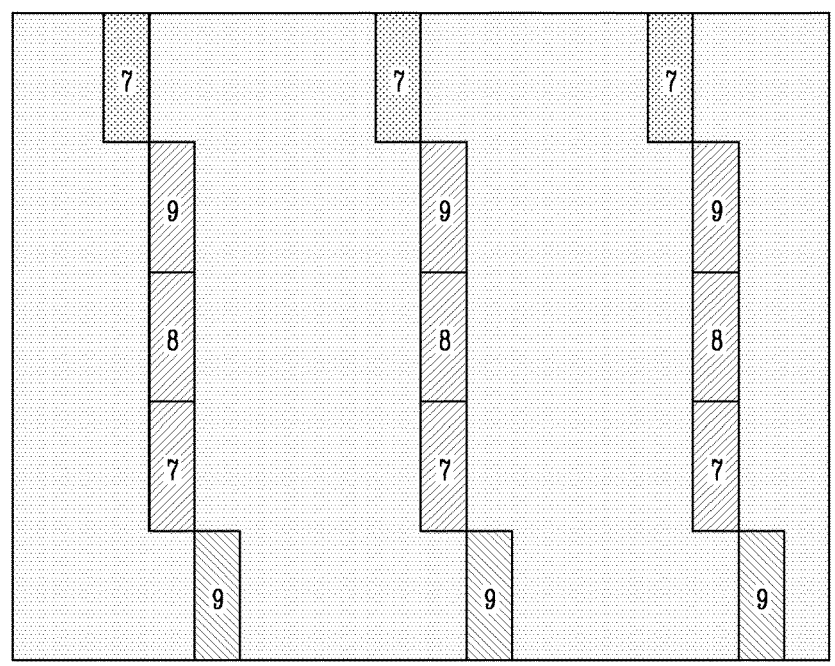

FIGS. 32A and 32B are views illustrating sub-pixels and views perceived by the left-eye and right-eye in an autostereoscopic 3D display device, according to the second embodiment of the present disclosure illustrated in FIG. 8, as an example.

Figure 33A:
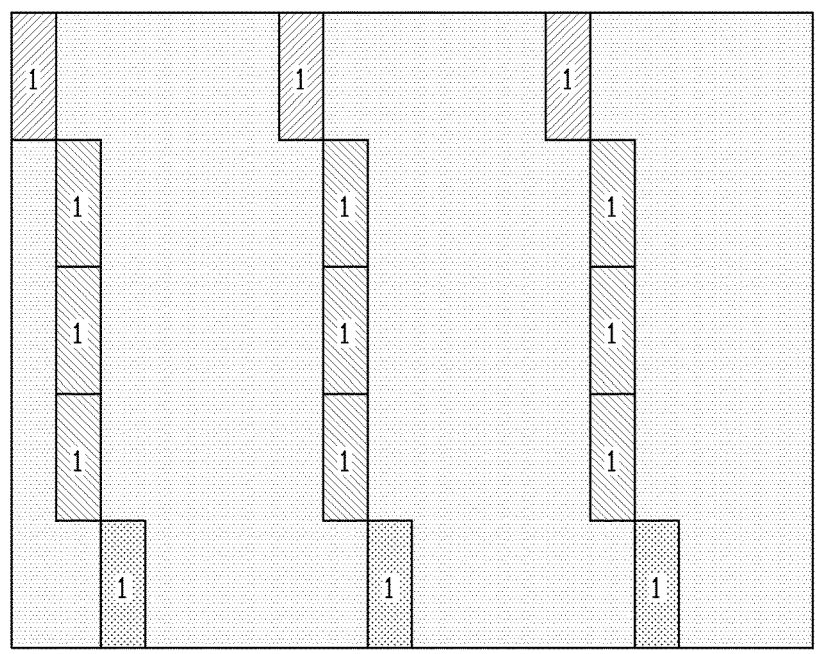
FIGS. 33A and 33B are views illustrating input data perceived by the left-eye and right-eye in an autostereoscopic 3D display device according to the second embodiment of the present disclosure illustrated in FIG. 8, as an example.
Figure 33B:
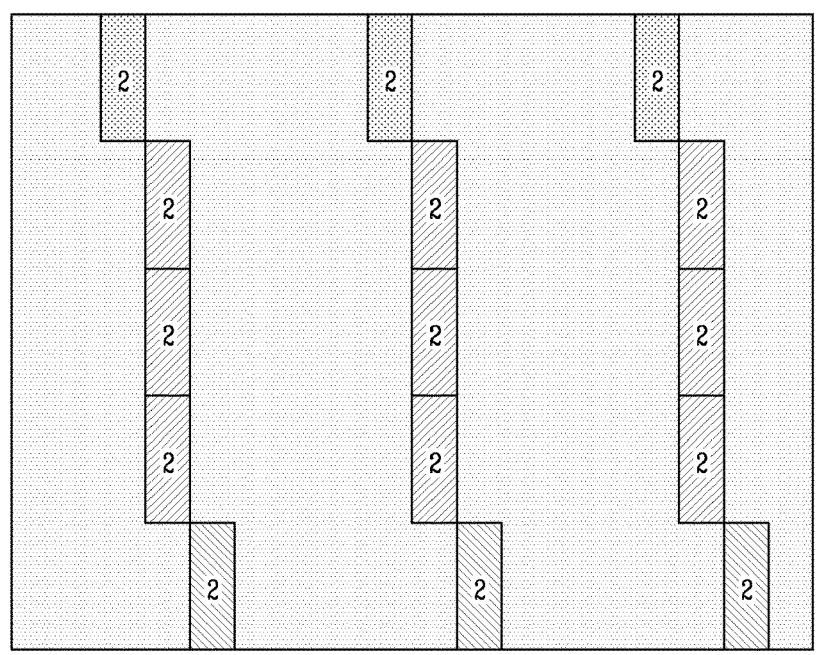

Furthermore, FIGS. 33A and 33B are views illustrating input data perceived by the left-eye and right-eye in an autostereoscopic 3D display device, according to the second embodiment of the present disclosure illustrated in FIG. 8, as an example.

Here, FIGS. 32A and 33A illustrate sub-pixels, views, and input data perceived from the left-eye, as an example, and FIGS. 32B and 33B illustrate sub-pixels, views, and input data perceived from the right-eye, as an example.

Figure 34A:
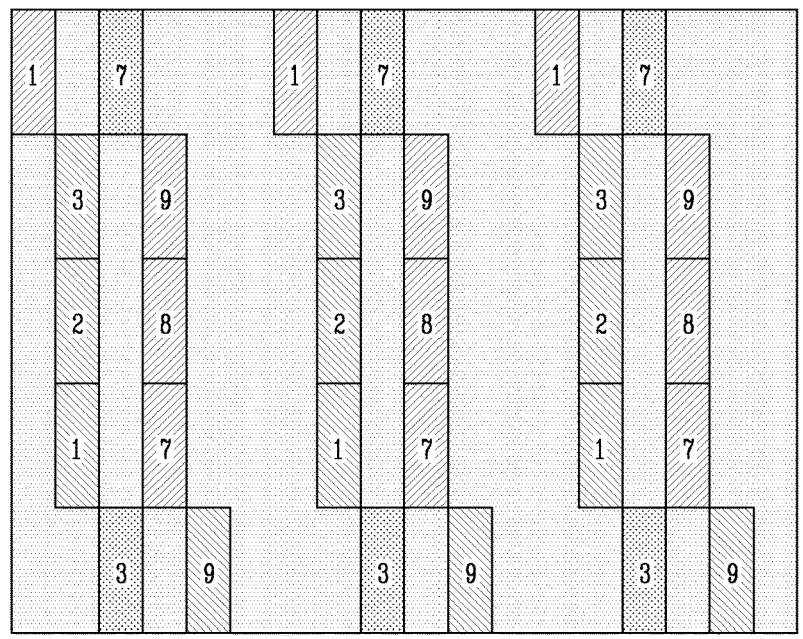
FIGS. 34A and 34B are views illustrating sub-pixels and input data perceived by both eyes in an autostereoscopic 3D display device, according to the second embodiment of the present disclosure illustrated in FIG. 8, as an example.
Figure 34B:
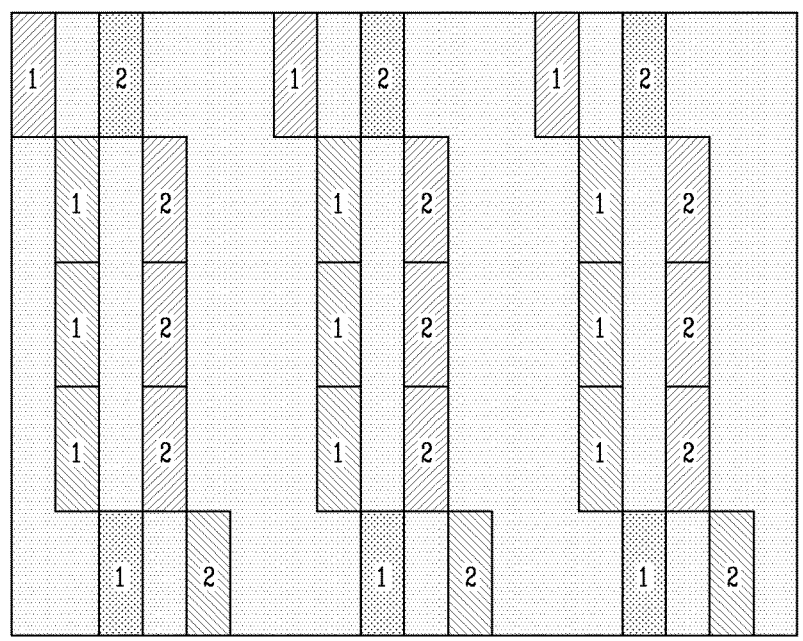

FIGS. 34A and 34B are views illustrating sub-pixels and input data perceived by both eyes in an autostereoscopic 3D display device, according to the second embodiment of the present disclosure illustrated in FIG. 8, as an example.

Referring to FIGS. 32A and 32B, an autostereoscopic 3D display device, according to the second embodiment of the present disclosure illustrated in FIG.8, has a three overlapping views structure, while the width of a viewing diamond is half of the interocular distance, thereby a single eye perceives three views at the same time.

However, due to having a three overlapping structure while at the same time reducing the width of a viewing diamond to half of the interocular distance, five viewing diamonds further exist between the left-eye and right-eye (refer to FIG. 13), and for an example, when the left-eye perceives a first view, the right-eye perceives a seventh view, spaced apart by the interocular distance (refer to FIG. 34A in the case of the interocular distance).

Here, when a view data rendering technology according to one embodiment of the present disclosure is applied, in the case of three overlapping views, as illustrated in FIGS. 33A and 33B, when the left-eye views a first view image, the right-eye views a second view image, spaced apart by the interocular distance (refer to FIG. 34B in the case of the interocular distance).

In this case, contrary to the foregoing first embodiment of the present disclosure, it is seen that a sub-pixel perceived from the left-eye and a sub-pixel perceived from the right-eye are spatially separated by one sub-pixel. In other words, a view map according to a second embodiment (and a third embodiment) of the present disclosure may be less affected by light interference generated between sub-pixels matching to the left-eye and right-eye when compared to a structure in the related art, thereby eliminating or reducing 3D crosstalk.

Accordingly, a number of viewing diamonds located between the interocular distance increases as the viewing diamond is set to be less than the interocular distance, and as a result, a distance between sub-pixels perceived by the left-eye and right-eye physically increases, thereby reducing 3D crosstalk. Furthermore, as a result, a blurred portion of the image perceived may be eliminated, thereby enhancing 3D depth perceived by the viewer.

Consequently, according to the present disclosure, 3D crosstalk perceived by the viewer in a viewing zone may be additionally reduced while at the same time securing viewing angle, and an image flipping phenomenon produced by a difference between images may be greatly reduced when the viewer moves from a reversed view zone to a normal view zone or from a normal view zone again to a reversed view zone. In other words, the number of view images entered as a whole may be reduced when compared to the related art, thereby reducing an image flipping phenomenon.

On the other hand, a basic view structure as described above may be set in consideration of all the factors, such as a resolution, an overlapping number, a viewing angle, and the like of the image panel.

According to embodiments of the present disclosure, there is a specified view structure form, such as the foregoing embodiments using a viewing diamond structure, and the features thereof are as follows.

Number of whole views ≤(N+1)×overlapping number of viewing diamonds (D)×(interocular distance/a width of the viewing diamond (D)), wherein N is a natural number, and a portion of N+1 is required since the minimum value capable of displaying a view image having a disparity between the left-eye and right-eye is 2.

Accordingly, in addition to the foregoing embodiments, it may be possible to form various types of view map structures reflecting the description of the present disclosure, and therefore, a suitable view data rendering technology may be also applicable thereto.

Although many embodiments have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

What is claimed is:

1. An autostereoscopic 3D display device, comprising:
   an image panel comprising a plurality of sub-pixels that collectively output light corresponding to a plurality of view images;
   a 3D filter disposed on a surface of the image panel, the 3D filter forming the plurality of view images within a plurality of viewing zones by directing the outputted light of the plurality of sub-pixels to the plurality of viewing zones, wherein each of the plurality of viewing zones overlaps one or more other viewing zones, and each of the plurality of view images is formed in a corresponding one of the plurality of viewing zones; and
   an intervening layer positioned between the image panel and the 3D filter, the intervening layer maintaining a gap between the image panel and the 3D filter;
   wherein a width of each of the plurality of viewing zones is set to a/n times (where a and n are natural numbers satisfying the condition: a<n) of an interocular distance, the interocular distance being a distance between an observer's eyes, and
   wherein when a width of the viewing zones is 1/n times of the interocular distance while having an I (where I =2, 3, 4, . . . ) overlapping structure of the viewing zones, n+(2I -3) viewing zones further exist between the observer's eyes, I representing a number of other viewing zones with which a given viewing zone overlaps.

2. The autostereoscopic 3D display device of claim 1, wherein a thickness of the intervening layer is n times a base thickness of the intervening layer.

3. The autostereoscopic 3D display device of claim 1, wherein the 3D filter comprises a lenticular lens sheet formed with a plurality of lenticular lenses, and wherein a pitch of the lenticular lens is 1/n times a base pitch the lenticular lens.

4. The autostereoscopic 3D display device of claim 1, wherein the 3D filter outputs a k-th view image displayed on a k-th sub-pixel as a k-th view.

5. The autostereoscopic 3D display device of claim 1, further comprising:
   a timing controller configured to map identical or similar input data between adjacent overlapping views.

6. The autostereoscopic 3D display device of claim 5, wherein the timing controller converts the input data corresponding to a viewing zone located between a left-eye and a right-eye to a view image which is identical or similar to a view image perceived by the left-eye or the right-eye.

7. The autostereoscopic 3D display device of claim 1, wherein a plurality of views are concurrently output to a left eye and a right eye of the observer.

8. The autostereoscopic 3D display device of claim 1, further comprising:
   a timing controller that groups input data into a plurality of groups, the input data in each group corresponding to a subset of the viewing zones that are adjoining, the timing controller further converting the input data in one or more of the groups into combined input data describing a single converted view image for the corresponding group;
   wherein the image panel outputs light such that a substantially identical viewing image forms in each viewing zone corresponding to a given group.

9. The autostereoscopic 3D display device of claim 8, wherein responsive to the input data including image data corresponding to sixteen viewing zones and each viewing zone overlapping with two other viewing zones, the timing controller groups the image data into four groups, each group including input data corresponding to four adjoining viewing zones, the timing controller further creating, for each group, the single converted view image based on the input data in the group.

10. The autostereoscopic 3D display device of claim 8, wherein at least one of the groups is a transition group, and the timing controller creates a medium view image based on the input data included in groups immediately adjacent to the transition group on either side of the transition group, the medium view image being an image part-way between the single converted view images of the immediately adjacent groups.

11. The autostereoscopic 3D display device of claim 10, wherein the medium view image is half-way between the single converted view images of the immediately adjacent groups.

12. The autostereoscopic 3D display device of claim 1, wherein a sub-pixel outputting light received by a left-eye and a sub-pixel outputting light received by a right-eye are spatially separated by one sub-pixel.

13. The autostereoscopic 3D display device of claim 8, wherein a number of viewing zones for which corresponding input data is included in a group is equal to or less than a product of an overlapping number of viewing zones and a quotient of interocular distance and the width of the viewing zones.

14. The autostereoscopic 3D display device of claim 13, wherein responsive to the number of viewing zones for which corresponding input data is included in a group being less than the product of the overlapping number of viewing zones and the quotient of the interocular distance and the width of the viewing zones, input data of a medium view is entered between two adjoining groups, the medium view image being half-way between the single converted view images of the adjoining groups.

15. The autostereoscopic 3D display device of claim 1, wherein a total number of the views is equal to or less than a product of (N+1), a number of overlapping viewing zones, and the quotient of the interocular distance and the width of the viewing zones, where N is a natural number.

16. The autostereoscopic 3D display device of claim 1, wherein the plurality of pixels are sequentially allocated with a first view through an m-th view on m of the sub-pixels, where m is a natural number.

17. The autostereoscopic 3D display device of claim 1, wherein a distance between centers of adjacent viewing zones is less than an interocular distance.

18. The autostereoscopic 3D display device of claim 1, wherein the plurality of overlapping viewing zones are diamond shaped.

19. The autostereoscopic 3D display device of claim 1, wherein the distance between the observer's eyes is an estimate based on a typical distance between human eyes.

20. The autostereoscopic 3D display device of claim 1, wherein the intervening layer is a gap glass.

* * * * *